US012367359B2

(12) United States Patent
Dinoev et al.

(10) Patent No.: US 12,367,359 B2
(45) Date of Patent: Jul. 22, 2025

(54) SECURITY MARKING, METHOD AND DEVICE FOR READING THE SECURITY MARKING, SECURITY DOCUMENT MARKED WITH THE SECURITY MARKING, AND METHOD AND SYSTEM FOR VERIFYING SAID SECURITY DOCUMENT

(71) Applicant: SICPA HOLDING SA, Prilly (CH)

(72) Inventors: Todor Dinoev, Chavannes-près-Renens (CH); Jean-Luc Dorier, Bussigny (CH); Xavier Cédric Raemy, Belmont-sur-Lausanne (CH); Benito Carnero, Préverenges (CH); Evgeny Loginov, Renens (CH); Andrea Callegari, Ecublens (CH)

(73) Assignee: SICPA HOLDING SA, Prilly (CH)

( * ) Notice: Subject to any disclaimer, the term of this patent is extended or adjusted under 35 U.S.C. 154(b) by 2 days.

(21) Appl. No.: 18/024,185

(22) PCT Filed: Aug. 30, 2021

(86) PCT No.: PCT/EP2021/073864
§ 371 (c)(1),
(2) Date: Mar. 1, 2023

(87) PCT Pub. No.: WO2022/049025
PCT Pub. Date: Mar. 10, 2022

(65) Prior Publication Data
US 2023/0281408 A1 Sep. 7, 2023

(30) Foreign Application Priority Data
Sep. 2, 2020 (EP) ..................................... 20194057

(51) Int. Cl.
G06K 7/14 (2006.01)
B42D 25/369 (2014.01)

(52) U.S. Cl.
CPC ......... *G06K 7/1417* (2013.01); *B42D 25/369* (2014.10)

(58) Field of Classification Search
CPC .. G06K 7/1417; B42D 25/369; B42D 25/305; B42D 25/23; B42D 25/24
See application file for complete search history.

(56) References Cited

U.S. PATENT DOCUMENTS 2,418,479 A 4/1947 Pratt et al.
2,570,856 A 10/1951 Pratt et al.
(Continued)

FOREIGN PATENT DOCUMENTS

DE 2006848 9/1971
EP 0406667 1/1995
(Continued)

OTHER PUBLICATIONS

Printing Technology, J. M. Adams and P. A. Dolin, Delmar Thomson Learning, 5th Edition, 2002, pp. 293, 332, and 352.
(Continued)

Primary Examiner — Matthew Mikels
(74) Attorney, Agent, or Firm — Muncy, Geissler, Olds & Lowe, P.C.

(57) ABSTRACT

The invention relates to a security marking (100), a method and a device for reading and decoding the security marking (100), a security document (150) marked with the security marking (100), and a method and a system for verifying and authenticating said security document (150). The security marking (100) comprises a machine readable marking (130) overlapping with a magnetically induced layer (120) of a material including magnetically oriented reflective platelet-shaped magnetic or magnetizable pigment particles with two zones (120a) and (120b) of distinct orientations of the particles. The encoded data on the machine readable mark- (Continued)

ing (130) being decodable only after the data separately read from the two zones (120a) and (120b) are gathered.

16 Claims, 19 Drawing Sheets

(56) References Cited

U.S. PATENT DOCUMENTS

| | | | |
|---|---|---|---|
| 3,676,273 | A | 7/1972 | Graves |
| 3,791,864 | A | 2/1974 | Steingroever |
| 4,838,648 | A | 6/1989 | Phillips et al. |
| 5,364,689 | A | 11/1994 | Kashiwagi et al. |
| 5,630,877 | A | 5/1997 | Kashiwagi et al. |
| 6,103,361 | A | 8/2000 | Batzar et al. |
| 6,410,130 | B1 | 6/2002 | Schuhmacher et al. |
| 6,531,221 | B1 | 3/2003 | Schuhmacher et al. |
| 6,582,781 | B1 | 6/2003 | Schuhmacher et al. |
| 6,838,166 | B2 | 1/2005 | Phillips et al. |
| 2002/0160194 | A1 | 10/2002 | Phillips et al. |
| 2004/0009308 | A1 | 1/2004 | Schlaf et al. |
| 2004/0062297 | A1 | 4/2004 | McDonough et al. |
| 2004/0112962 | A1* | 6/2004 | Farrall ............... G08B 13/2442 235/462.01 |
| 2007/0170248 | A1 | 7/2007 | Brundage et al. |
| 2011/0190920 | A1 | 8/2011 | Mercolino |
| 2014/0224879 | A1 | 8/2014 | Guigan |
| 2015/0014984 | A1 | 1/2015 | Decoux et al. |
| 2016/0378061 | A1 | 12/2016 | Reinhardt |
| 2019/0351693 | A1* | 11/2019 | Delst ................... B42D 25/425 |

FOREIGN PATENT DOCUMENTS

| | | |
|---|---|---|
| EP | 0710508 | 5/1996 |
| EP | 0686675 | 2/1998 |
| EP | 2402401 | 11/2013 |
| EP | 3178569 | 6/2017 |
| EP | 3587500 | 1/2020 |
| WO | 0209002 | 1/2002 |
| WO | 02025599 | 3/2002 |
| WO | 02073250 | 9/2002 |
| WO | 02090002 | 11/2002 |
| WO | 03000801 | 1/2003 |
| WO | 2005002866 | 1/2005 |
| WO | 2006061301 | 6/2006 |
| WO | 2006063926 | 6/2006 |
| WO | 2007131833 | 11/2007 |
| WO | 2012136902 | 10/2012 |
| WO | 2013071960 | 5/2013 |
| WO | 2014160582 | 10/2014 |
| WO | 2015052318 | 4/2015 |
| WO | 2015193152 | 12/2015 |
| WO | 2019103937 | 5/2019 |
| WO | 2019243033 | 12/2019 |
| WO | 2020006286 | 1/2020 |

OTHER PUBLICATIONS

R. C. Gonzalez, T. E. Woods, "Digital Image Processing", Fourth Edition, Pearsons, 2017, 1022 pages.
C. M. Bishop, "Pattern Recognition and Machine Learning", Springer, 2006, 703 pages.
O. Mazhelis, "One-Class Classifiers: A Review and Analysis of Suitability in the Context of Mobile- Masquerader Detection," South African Computer Journal, col. 36, pp. 29-48, 2006.
I. GoodFellow, Y. Bengio, A. Courville, "Deep Learning", MIT Press, 2016, 802 pages.
V. Lepetit and al., "EPnP: An accurate o(n) solution to the pnp problem" International Journal of Computer Vision, 81(2), pp. 155-166, 2009.
Extended European Search Report issued with respect to application No. 20194057.4.
International Search Report and Written Opinion issued with respect to application No. PCT/EP2021/073864.

* cited by examiner

800

800

SECURITY MARKING, METHOD AND DEVICE FOR READING THE SECURITY MARKING, SECURITY DOCUMENT MARKED WITH THE SECURITY MARKING, AND METHOD AND SYSTEM FOR VERIFYING SAID SECURITY DOCUMENT

TECHNICAL FIELD

The present invention relates to the field of magnetically induced layers, methods and devices for reading a magnetically induced layer, and methods and systems for verifying and authenticating documents including magnetically induced layers, wherein said magnetically induced layer comprises oriented magnetic or magnetizable pigment particles.

BACKGROUND OF THE INVENTION

It is known in the art to use inks, compositions, coatings or layers containing oriented magnetic or magnetizable pigment particles, particularly also optically variable magnetic or magnetizable pigment particles, for the production of security elements in the form of magnetically induced marking, e.g. in the field of security documents. Coatings or layers comprising oriented magnetic or magnetizable pigment particles are disclosed for example in U.S. Pat. Nos. 2,570,856; 3,676,273; 3,791,864; 5,630,877 and 5,364,689. Coatings or layers comprising oriented magnetic color-shifting pigment particles, resulting in particularly appealing optical effects, useful for the protection of security documents, have been disclosed in WO 2002/090002 A2 and WO 2005/002866 A1.

Magnetic or magnetizable pigment particles in printing inks or coatings allow for the production of magnetically induced layers, designs and/or patterns through the application of a corresponding magnetic field, causing a local orientation of the magnetic or magnetizable pigment particles in the unhardened coating, followed by hardening of the latter. The result is a fixed magnetically induced layer, design or pattern. Materials and technologies for the orientation of magnetic or magnetizable pigment particles in coating compositions have been disclosed in U.S. Pat. Nos. 2,418,479; 2,570,856; 3,791,864, DE 2006848-A, U.S. Pat. Nos. 3,676,273, 5,364,689, 6,103,361, EP 0 406 667 B1; US 2002/0160194; US 2004/70062297; US 2004/0009308; EP 0 710 508 A1; WO 2002/09002 A2; WO 2003/000801 A2; WO 2005/002866 A1; WO 2006/061301 A1; these documents are incorporated herein by reference. In such a way, magnetically induced layers which are highly resistant to counterfeit can be produced. The so-obtained magnetically induced layers produce an angular reflection profile that is substantially asymmetric with respect to the normal to the substrate onto which they are applied. This is unusual and differs from the classical specular or Lambertian reflection/scattering behavior.

Security features, e.g. for security documents, can generally be classified into "covert" security features on the one hand, and "overt" security features on the other hand. The protection provided by covert security features relies on the concept that such features are difficult to detect, typically requiring specialized equipment and knowledge for detection, whereas "overt" security features rely on the concept of being easily detectable by the unaided human senses, e.g. such features may be visible and/or detectable via the tactile senses while still being difficult to produce and/or to copy. Magnetically induced layers are typically used as "overt" (or level 1) security features which should allow direct and unambiguous authentication by the human without any external device or tool. However, the effectiveness of overt security features depends to a great extent on their easy recognition as security features, because most users, and particularly those having no prior knowledge of the security features of a document or item secured therewith, will only then actually perform a security check based on said security features if they have actual knowledge of their existence and nature.

Even though the security level of magnetically induced layers is high in terms of resistance to copy, the average consumer could potentially be confused as to which exact effect should be observed for a particular overt security element on a given product. In particular, a flipping hologram (low security, low cost security element) producing a similar pattern or logo may lead to misinterpretation of authenticity by an untrained consumer, as it will also produce an angular dependent reflection pattern.

Many authentication methods using a portable (handheld) device, e.g. a smartphone, have emerged these recent years. Most of them rely on the imaging capabilities of the smartphone camera to extract geometrical or topological information below the human eye resolution, such as the one disclosed in WO 0225599 A1, or beyond the capability of humans to extract signals very close to the noise or to interpret weak variations in the printed design colors or shapes, as disclosed in WO 2013071960 A1. These methods have the advantage of extracting a coded information for identification but require, on the other hand, a high-resolution printing and/or magnifying optics attached to the smartphone camera.

Other authentication methods applicable to low resolution printed features have been developed which rely on a colorimetric analysis of the security feature, as disclosed in US 2011190920, based on holograms, or such as the SICPASMART™ disclosed in WO 2015052318 A1, which analyzes the color-shifting properties of optically variable patterns measured during an augmented reality assisted azimuthal displacement of the smartphone around the pattern. These methods rely on a smartphone camera movement with respect to the mark which is complicated to achieve. Moreover, they depend on external light illumination and hence are highly sensitive to ambient light conditions (e.g. direct sunlight, dark environment or highly chromatically unbalanced illumination).

Other authentication methods of features having angular dependence of the reflected intensity have been proposed, such as randomly oriented flakes, as disclosed in WO 2012 136902 A1 and US 20140224879, micro-mirror, diffractive features like holograms or embossed 3D structures, as disclosed in WO 2015193152 A1 or US 2016378061. These are based on two-angular positions of the camera to capture two images which are then analyzed.

It remains a challenge to control both the camera of the smartphone and the sample illumination in order to obtain reproducible measurements of the reflectivity of a security feature. Smartphone cameras normally use automated exposure and focusing algorithms which are adapted to typical camera usage (e.g. landscape or portrait photographs) but such algorithms are not adapted to imaging of highly reflective markings with magnetically induced layers. The illumination of the security feature can originate from the ambient lightning indoors or outdoors which is in general unknown and difficult to control and can hamper reliable detection of the specific security features of magnetically induced layers such as angular reflectivity.

Accordingly, currently known smartphone-based authentication techniques have a number of disadvantages including the following ones: they require high resolution printing of fine structures; and/or they rely on complex smartphone movements to reveal a color, and/or they are not reliable due to limited available information to accurately authenticate the exact angular dependence.

It is therefore desired to propose to the public, and potentially also to the relevant inspectors, an improved, accurate and reliable technical solution that is robust against ambient light perturbations, does not rely on high resolution printing or on complex movement of the smartphone and avoids a difficult to control and non-intuitive tilted or azimuthal position or complex rotation movement.

In particular, there is a need for an authentication method and device, which can unambiguously distinguish a given magnetically induced layer from another one or from another overt security feature produced with other techniques and from an imitation based on another technology that attempts to mimic or simulate the effect but reproduces the security feature or logo topology and has some angular dependence of the reflected intensity.

Authorizing access of a user to a given service (e.g. via a website) through a communication network (e.g. internet or a local network) to allow the user to perform some operations (e.g. financial operations on a bank account of the user) is well known. Generally, the user has to "prove" his identity by using a cryptographic key and/or a password for making a request to an authority managing the access: only if the password and/or the key is correct, full access to the service is authorized. However, a level of confidence with that sort of access is quite low, as the password or key can be stolen, or the user may as well be registered (e.g. on the website or with its control authority) under a false identity. Thus, there is a need for improving the level of confidence of personal access credential.

On the other hand, it is well known to use secured government-issued identity documents (such as identity cards or passports) to prove a holder's identity to a control agent (e.g. at a check-in counter), and then gain access to some services (or to a building). In this case, the agent will control some security markings, difficult to counterfeit, provided on the holder's identity document, possibly check a similarity of the holder's face with biometry data and/or an identity photograph, and then, i.e. when the agent has acquired a sufficient level of confidence on the identity of said holder, said agent allows the holder to perform some authorized operations. For example, document WO 2014/160582 A1 discloses a method, which includes the steps of: generating an association, at a mobile device, between a government-issued identity document of a user and a mode of payment; receiving, at the mobile device, a presentation of the government-issued identity document of the user to support a request for payment; validating whether the presented government-issued identity document is a valid identification of the user; and in response to validating the presented government-issued identity document, proceeding with payment by using the mode of payment. The government-issued identity document may comprise printed text, magnetic media and a barcode.

Also well-known is an authentication method applicable for security documents, which is disclosed in document US 2007/170248 A1. The mentioned authentication method includes capturing by a reader an image of a cardholder's face. Facial recognition software processes the image to generate a hash. The same reader is used to decode the digital watermark and/or barcode. The digital watermark (and/or barcode) includes a related facial recognition hash. If the hashes match, the individual and the identification document are authenticated.

A goal of the invention is to eliminate the necessity of a preliminary identity control via an agent and allow any user to directly access to online services provided by a private or public operator while providing to the operator a high level of confidence with respect to the user's true identity (and thus, true rights to perform operations).

It is therefore a goal of the present invention to provide a method of authenticating a magnetically induced layer used as overt security feature printed or affixed on a substrate (such as a label, product or document), using a portable device, preferably a smartphone, in order to overcome the disadvantages of the prior art.

It is a further goal of the present invention to provide a portable device, preferably a smartphone, for authenticating a magnetically induced layer applied on a substrate, which is easy to control, which has a good immunity to ambient light variability and is highly resistant to imitations and easy to discriminate against other angular dependent reflective marks.

It is a further goal of the present invention to provide a method and a system for both verifying a content of a document and authenticating said document marked with a magnetically induced layer according to the invention.

It is a further goal of the present invention to provide a corresponding non-transitory computer-readable medium comprising computer code parts or instructions executable by a processor to cause a portable device equipped with a light source and an imager to perform the methods of reading, decoding and authenticating as described herein.

SUMMARY OF THE INVENTION

According to one aspect, the invention relates to a security marking (100) comprising:
  a flat substrate (110);
  a magnetically induced layer (120) of a material comprising magnetically oriented reflective platelet-shaped magnetic or magnetizable pigment particles, the magnetically induced layer (120) being applied on the substrate (110) and comprising a first zone (120a) wherein said magnetically oriented reflective platelet-shaped magnetic or magnetizable pigment particles have their planar faces oriented in a first direction and a second zone (120b), distinct from the first zone (120a), wherein said magnetically oriented reflective platelet-shaped magnetic or magnetizable pigment particles have their planar faces oriented in a second direction distinct from the first direction, the platelet-shaped particles in the first zone (120a) having planar faces with an elevation angle $\gamma_1$ with respect to a plane of the substrate (110) and the platelet-shaped particles in the second zone (120b) having planar faces with an elevation angle $\gamma_2$ with respect to the plane of the substrate (110), each acute angle of the planar faces with respect to the plane of the substrate (110) being in a range from about 5° to about 25°;
  a machine readable marking (130) including a reference pattern (133) and a code pattern (134) representing encoded data, the machine readable marking (130) being respectively applied either on a top face (121) of the magnetically induced layer (120) or on the substrate (110) between said substrate and a rear face (122) of the magnetically induced layer (120), a first area (134a) of the code pattern (134) being disposed in front of the first zone (120*a*) and a remaining second area (134*b*) of the code pattern (134) being disposed in front of the second zone (120*b*).

In the above security marking (100):
a) said pigment particles may comprise:
   a magnetic metal selected from the group consisting of cobalt, iron, gadolinium and nickel;
   a magnetic alloy of iron, chromium, manganese, cobalt, nickel or a mixture of two or more thereof;
   a magnetic oxide of chromium, manganese, cobalt, iron, nickel or a mixture of two or more thereof; or
   a mixture of two or more thereof; or
b) the code pattern may be any one of a one-dimensional barcode, a stacked one-dimensional barcode, a two-dimensional bar code, and a three-dimensional barcode.

The first zone (120*a*) and the second zone (120*b*) of the magnetically induced layer (120) may belong to a same single layer of material. Alternatively, the first zone (120*a*) and the second zone (120*b*) of the magnetically induced layer (120) may respectively belong to a first sub-layer and an adjacent second sub-layer forming the magnetically induced layer (120) (by "adjacent", it is meant that the first and second sub-layers may be in direct contact or may be spaced apart).

In the above security marking (100), the machine readable marking (130) may be applied on the top face (121) of the magnetically induced layer (120) and encoded with dark symols and a dark primer layer (140) may be applied on the substrate (110), and a rear face (122) of the magnetically induced layer (120) may be applied on a top face (141) of the dark primer layer (140).

According to another embodiment of the security marking (100), the machine readable marking (130) may be applied on the top face (121) of the magnetically induced layer (120) and encoded with bright symbols and a dark primer layer (140), preferably a black primer, may be applied on the substrate (110), and the rear face (122) of the magnetically induced layer (120) may be applied on the top face (141) of the dark primer layer (140).

In the above security marking (110), the machine readable marking (130) may be applied on the substrate (110) and encoded with dark symbols.

According to another aspect, the invention relates to method for reading and decoding the above security marking (100) with a portable device (200) equipped with a light source (201) operable to deliver illumination light, an imager (202), and a processor equipped with a memory and adapted to perform image processing and decoding operations, comprising the steps of:

disposing the security marking (100) and within a field of view of the imager (202);
illuminating the security marking (100) with illumination light delivered by the light source (201);
acquiring a first digital image of the security marking (100) with the imager (202) at a first viewing angle $\theta_1$ associated with the first elevation angle $\gamma_1$, and storing the acquired first digital image in the memory;
acquiring a second digital image of the security marking (100) with the imager (202) at a second viewing angle $\theta_2$ associated with the second elevation angle $\gamma_2$, and storing the acquired second digital image in the memory;
forming, via image processing with the processor, a composite digital image of the code pattern (134) from the stored first digital image and the stored second digital image by aligning with respect to the reference pattern (133), detected in the first digital image and the second digital image, a first part of the code pattern (134) corresponding to the first area (134*a*) of the code pattern detected on the first digital image and a second part of the code pattern (134) corresponding to the second area (134*b*) of the code pattern detected on the second digital image, and storing the obtained composite digital image in the memory;
reading and decoding with the processor the code pattern (134) from the stored composite digital image.

The invention also relates to a portable device (200) for reading and decoding the above security marking (100), comprising:
a light source (201) operable to deliver illumination light;
an imager (202); and
a processor equipped with a memory and adapted to perform the steps of the above method for reading and decoding the security marking (100) on digital images of said security marking (100) acquired by the imager (202).

A further aspect of the invention relates to a security document (150) delivered by an authority to a user, and comprising:
a security marking (100) according to the invention applied on the security document (150), wherein encoded data in the code pattern (134) of the security marking (100) contain digital identity data corresponding to the user and a digital signature of said user digital identity data, the digital signature delivered by the authority being obtained by signing the user digital identity data with a cryptographic key.

Another aspect of the invention relates to a method of verifying the above security document (150) of a user with the above mentioned portable device (200) further equipped with a communication unit operable to send and receive data over a communication network (CN) to a server (S) of the authority connected to a database (DB) storing the cryptographic key and a corresponding decryption key, said method comprising the steps of:

disposing the security marking (100) within a field of view of the imager (202);
illuminating the security marking (100) of the security document (150) with the light source (201);
acquiring a first digital image of the illuminated security marking (100) with the imager (202) at a first viewing angle $\theta_1$ associated with the first elevation angle $\gamma_1$, and storing the acquired first digital image in the memory;
acquiring a second digital image of the illuminated security marking (100) with the imager (202) at a second viewing angle $\theta_2$ associated with the second elevation angle $\gamma_2$, and storing the acquired second digital image in the memory;
forming, via image processing with the processor, a composite digital image of the code pattern (134) from the stored first digital image and the stored second digital image by aligning with respect to the reference pattern (133), detected in the first digital image and the second digital image, a first part of the code pattern (134) corresponding to the first area (134*a*) of the code pattern detected on the first digital image and a second part of the code pattern (134) corresponding to the second area (134*b*) of the code pattern detected on the second digital image;
reading and decoding the code pattern (134) from the composite digital image, and extracting from decoded data of the code pattern (134) a user identity data and a digital signature of said user identity data, via image processing and decoding operations with the processor, and storing the extracted user identity data and digital signature in the memory;

sending a first message (M1) containing the extracted user identity data and digital signature stored in the memory via the communication unit to the server (S);

decrypting at the server (S) the extracted digital signature received in the first message (M1) from the portable device (200) with the decryption key stored in the database (DB), and checking whether the extracted user identity data received in the first message (M1) matches the received extracted digital signature; and in case of matching, sending back to the portable device (200) a server message (SM) indicating a successful verification of the user identity data.

According to a variant, the above method of verifying the security document (150) may comprise, prior to the step of sending back the server message (SM) to the portable device (200), the preliminary steps of:

illuminating the magnetically induced layer (120) with the light source (201) and acquiring a plurality of digital images of the illuminated magnetically induced layer (120) with the imager (202), the imager (202) being for each different digital image at a corresponding distinct viewing angle θ with respect to said magnetically induced layer (120), by moving the imager relatively to the magnetically induced layer (120) parallel to the plane of the substrate (110);

for each acquired digital image, calculating, with the processor, respectively corresponding intensity I of light reflected by the magnetically induced layer (120) and collected by the imager (202) at corresponding viewing angle θ, and storing the calculated intensities of the reflected light and corresponding viewing angles to obtain a corresponding reflected light intensity curve I(θ);

sending with the communication unit a second message (M2) to the server (S) via the communication network (CN) containing the obtained reflected light intensity curve I(θ);

comparing at the server (S) the reflected light intensity curve I(θ) received in the second message (M2) with a reference reflected light intensity curve $I_{ref}(\theta)$ for said magnetically induced layer (120) stored in the database (DB);

determining at the server (S) whether the magnetically induced layer (120) is genuine based on a result of the comparison, and, in case the magnetically induced layer (120) is determined as genuine, sending back to the portable device (200) the server message (SM) indicating a successful verification of the user identity data together with an indication that the security marking (120) is genuine, and sending by the server (S) via the communication network (CN) a server authorization message (SAM) to a communication device of the user containing access data granting to the user access to a service. The communication device of the user may be the portable device (200) itself.

According to an alternative variant, the above method of verifying the security document (150) may comprise, in case of delivering by the server (S) of a server message (SM) indicating a successful verification of the user identity data, the further steps of:

illuminating the magnetically induced layer (120) with the light source (201) and acquiring a plurality of digital images of the illuminated magnetically induced layer (120) with the imager (202), the imager (202) being for each different digital image at a corresponding distinct viewing angle θ with respect to said magnetically induced layer (120), by moving the imager (202) relatively to the magnetically induced layer (120) parallel to the plane of the substrate (110);

for each acquired digital image, calculating, with the processor, respectively corresponding intensity I of light reflected by the magnetically induced layer (120) and collected by the imager (202) at corresponding viewing angle θ, and determining with the calculated intensities of the reflected light and corresponding viewing angles a corresponding reflected light intensity curve I(θ);

comparing via the processor the reflected light intensity curve I(θ) with a reference reflected light intensity curve $I_{ref}(\theta)$ for said magnetically induced layer (120) stored in the memory;

determining whether the magnetically induced layer (120) is genuine based on a result of the comparison, and, in case the magnetically induced layer (120) is determined as genuine, sending to the server (S), with the communication unit via the communication network (CN), a message (M) indicating that the security marking (100) is genuine; and in case of reception at the server (S) of a message (M) from the portable device indicating that the security marking (100) is genuine, sending back by the server (S) via the communication network (CN) a server authorization message (SAM) to a communication device of the user containing access data granting to the user access to a service. The communication device of the user may be the portable device (200) itself.

A further aspect of the invention relates to a system for verifying a security document (150) according to the invention delivered by an authority to a user, the system comprising:

a server (S) of the authority connected to a database (DB), and operable to send and receive data via a communication network (CN);

a portable device (200) according to the invention for reading and decoding the security marking (100) according to the invention applied on the security document (150), comprising:

a light source (201) operable to deliver illumination light;

an imager (202);

a communication unit operable to send and receive data over the communication network (CN) to the server (S); and a processor equipped with a memory and adapted to perform image processing and decoding operations to carry out the steps of the above method for reading and decoding the security marking (100) on digital images of said security marking taken by the imager (202);

wherein the server (S) and the portable device (200) are further adapted to carry out the steps of the method of verifying the security document (150) of the user by:

illuminating the security marking (100) of the security document (150) with the light source (201), the security marking (100) being within a field of view of the imager (202);

acquiring a first digital image of the illuminated security marking (100) with the imager (202) at a first viewing angle $\theta_1$ associated with the first elevation angle $\gamma_1$, and storing the acquired first digital image in the memory;

acquiring a second digital image of the illuminated security marking (100) with the imager (202) at a second viewing angle $\theta_2$ associated with the second elevation angle $\gamma_2$, and storing the acquired second digital image in the memory;

forming, via image processing with the processor, a composite digital image of the code pattern (134) from the stored first digital image and the stored second digital image by aligning with respect to the reference pattern (133), detected in the first digital image and the second digital image, a first part of the code pattern (134) corresponding to the first area (134a) of the code pattern (134) detected on the first digital image and a second part of the code pattern (134) corresponding to the second area (134b) of the code pattern (134) detected on the second digital image;

reading and decoding the code pattern (134) from the composite digital image, and extracting from decoded data of the code pattern (134) a user identity data and a digital signature of said user identity data, via image processing and decoding operations with the processor, and storing the extracted user identity data and digital signature in the memory;

sending a first message (M1) containing the extracted user identity data and digital signature stored in the memory via the communication unit to the server (S);

decrypting at the server (S) the extracted digital signature received in the first message (M1) from the portable device (200) with the decryption key stored in the database (DB), and checking that the extracted user identity data received in the first message (M1) matches the received extracted digital signature; and in case of matching, sending back to the portable device (200) a server message (SM) indicating a successful verification of the user identity data.

A first variant of the above system for verifying a security document (150) according to the invention delivered by an authority to a user, wherein the server (S) is further adapted to send data via the communication network (CN) to a communication device of the user; and the server (S) and the portable device (200) are further adapted to carry out, prior to the step of sending back a server message (SM) to the portable device, the preliminary steps of:

illuminating the magnetically induced layer (120) with the light source and acquiring a plurality of digital images of the illuminated magnetically induced layer (120) with the imager (202), the imager (202) being for each different digital image at a corresponding distinct viewing angle $\theta_1$ with respect to said magnetically induced layer (120), by moving the imager (202) relatively to the magnetically induced layer (120) parallel to the plane of the substrate (110);

for each acquired digital image, calculating, with the processor, respectively corresponding intensity I of light reflected by the magnetically induced layer (120) and collected by the imager (202) at corresponding viewing angle $\theta$, and storing the calculated intensities of the reflected light and corresponding viewing angles to obtain a corresponding reflected light intensity curve $I(\theta)$;

sending with the communication unit a second message (M2) to the server (S) via the communication network (CN) containing the obtained reflected light intensity curve $I(\theta)$;

comparing at the server (S) the reflected light intensity curve $I(\theta)$ received in the second message (M2) with a reference reflected light intensity curve $I_{ref}(\theta)$ for said magnetically induced layer (120) stored in the database (DB);

determining at the server (S) whether the magnetically induced layer (120) is genuine based on a result of the comparison; and in case the magnetically induced layer (120) is determined as genuine, sending back to the portable device (200) the server message (SM) indicating a successful verification of the user identity data together with an indication that the security marking (100) is genuine, and sending by the server (S) via the communication network (CN) a server authorization message (SAM) to a communication device of the user containing access data granting to the user access to a service.

A second variant of the above system for verifying a security document (150) according to the invention delivered by an authority to a user, wherein the server (S) is further adapted to send data via the communication network (CN) to a communication device of the user; and the server (S) and the portable device (200) are further adapted to carry out the steps of:

in case of delivering by the server (S) of a server message (SM) indicating a successful verification of the user identity data, the further steps of:

illuminating the magnetically induced layer (120) with the light source and acquiring a plurality of digital images of the illuminated magnetically induced layer (120) with the imager (202), the imager (202) being for each different digital image at a corresponding distinct viewing angle $\theta_1$ with respect to said magnetically induced layer (120), by moving the imager (202) relatively to the magnetically induced layer (120) parallel to the plane of the substrate (110);

for each acquired digital image, calculating, with the processor, respectively corresponding intensity I of light reflected by the magnetically induced layer (120) and collected by the imager (202) at corresponding viewing angle $\theta$, and determining with the calculated intensities of the reflected light and corresponding viewing angles a corresponding reflected light intensity curve $I(\theta)$;

comparing via the processor the reflected light intensity curve $I(\theta)$ with a reference reflected light intensity curve $I_{ref}(\theta)$ for said magnetically induced layer (120) stored in the memory;

determining whether the magnetically induced layer (120) is genuine based on a result of the comparison, and, in case the magnetically induced layer (120) is determined as genuine, sending to the server (S), with the communication unit via the communication network (CN), a message (M) indicating that the security marking (100) is genuine; and in case of reception at the server (S) of a message (M) from the portable device (200) indicating that the security marking (100) is genuine, sending back by the server (S) via the communication network (CN) a server authorization message (SAM) to a communication device of the user containing access data granting to the user access to a service.

The present invention will be described more fully hereinafter with reference to the accompanying drawings in which like numerals represent like elements throughout the different figures, and in which prominent aspects and features of the invention, in no way limiting, are illustrated.

DETAILED DESCRIPTION

Figure 1:
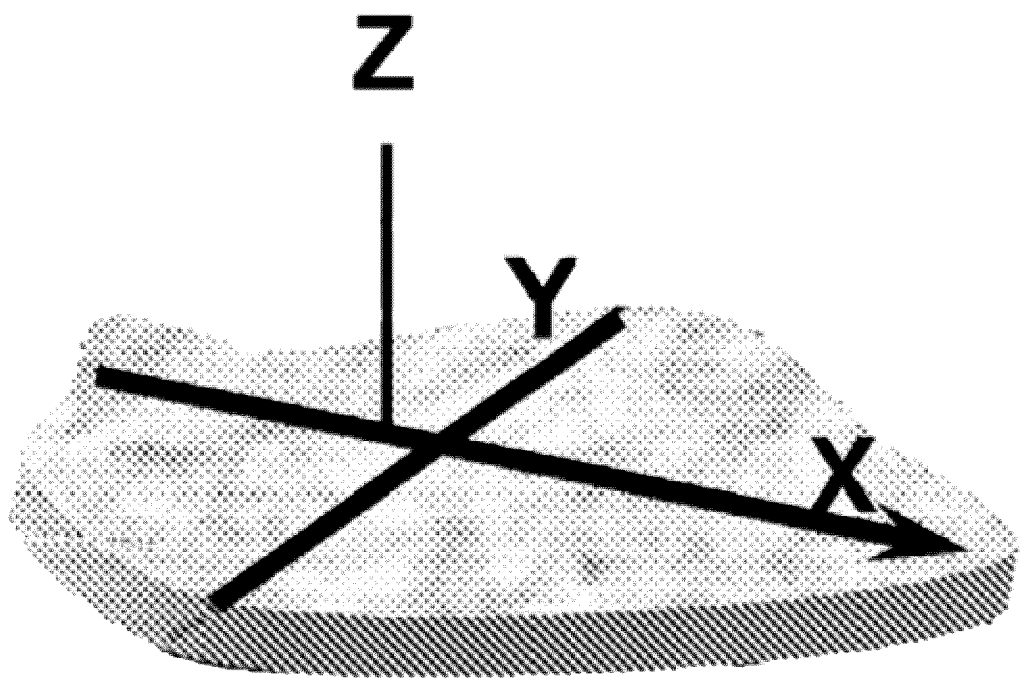
FIG. 1 schematically illustrates a platelet-shaped pigment particle, with Cartesian axes (X,Y,Z) attached to a (substantially planar) face of the particle.

The following definitions are to be used to interpret the meaning of the terms discussed in the description and recited in the claims.

As used herein, the term "at least one" is meant to define one or more than one, for example one or two or three.

As used herein, the terms "about" mean that the amount or value in question may be the specific value designated or some other value in its neighborhood. Generally, the term "about" denoting a certain value is intended to denote a range within ±5% of the value. As one example, the phrase "about 100" denotes a range of 100±5, i.e. the range from 95 to 105. Generally, when the term "about" is used, it can be expected that similar results or effects according to the invention can be obtained within a range of ±5% of the indicated value.

As used herein, the term "and/or" means that either all or only one of the elements of said group may be present. For example, "A and/or B" shall mean "only A, or only B, or both A and B". In the case of "only A", the term also covers the possibility that B is absent, i.e. "only A, but not B".

The terms "comprising" and "containing" as used herein are intended to be non-exclusive and open-ended. Thus, for instance a mixture comprising/containing a compound A may include other compounds besides A. However, the terms "comprising" and "containing" also cover, as a particular embodiment thereof, the more restrictive meanings of "consisting essentially of" and "consisting of", so that for instance "a mixture comprising A, B and optionally C" may also (essentially) consist of A and B, or (essentially) consist of A, B and C.

The security marking (100) described herein comprises a flat substrate (110) that is preferably selected from the group consisting of papers or other fibrous materials (including woven and non-woven fibrous materials), such as cellulose, paper-containing materials, glasses, metals, ceramics, plastics and polymers, metallized plastics or polymers, composite materials and mixtures or combinations of two or more thereof. Typical paper, paper-like or other fibrous materials are made from a variety of fibers including without limitation abaca, cotton, linen, wood pulp, and blends thereof. However, according to a different embodiment, the substrate (110) may be based on plastics and polymers, metallized plastics or polymers, composite materials and mixtures or combinations of two or more thereof. Suitable examples of plastics and polymers include polyolefins such as polyethylene (PE) and polypropylene (PP) including biaxially oriented polypropylene (BOPP), polyamides, polyesters such as poly(ethylene terephthalate) (PET), poly(1,4-butylene terephthalate) (PBT), poly(ethylene 2,6-naphthoate) (PEN) and polyvinylchlorides (PVC). Spunbond olefin fibers such as those sold under the trademark Tyvek® may also be used as substrate. Typical examples of metalized plastics or polymers include the plastic or polymer materials described hereabove having a metal disposed continuously or discontinuously on their surface. Typical examples of metals include without limitation aluminum (Al), chromium (Cr), copper (Cu), gold (Au), silver (Ag), alloys thereof and combinations of two or more of the aforementioned metals. The metallization of the plastic or polymer materials described hereabove may be done by an electrodeposition process, a high-vacuum coating process or by a sputtering process. Typical examples of composite materials include without limitation multilayer structures or laminates of paper and at least one plastic or polymer material such as those described hereabove as well as plastic and/or polymer fibers incorporated in a paper-like or fibrous material such as those described hereabove. Of course, the substrate can comprise further additives that are known to the skilled person, such as fillers, sizing agents, whiteners, processing aids, reinforcing or wet strengthening agents, etc.

Figure 2A:
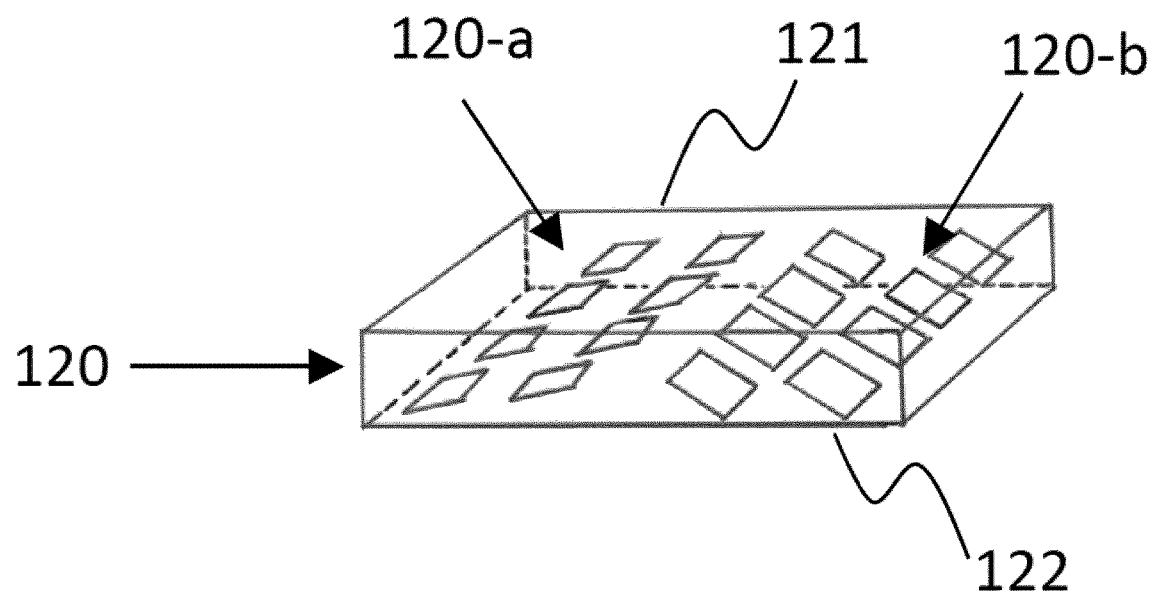
FIG. 2A is a schematic illustration of a magnetically induced layer (120) according an embodiment of the invention comprising two zones (120a, 120b) wherein magnetically oriented reflective platelet-shaped magnetic or magnetizable pigment particles have different orientations with respect to a plane of the rear face (122) of the magnetically induced layer (120): a first zone (120a) with reflective platelet-shaped pigment particles having a first elevation angle $\gamma_1$ and a second area (120b) with reflective platelet-shaped pigment particles having a second elevation angle $\gamma_2$.

According to an embodiment of the invention, the security marking (100), e.g. as illustrated on FIG. 2, comprises a magnetically induced layer (120) made of a material comprising a plurality magnetically oriented reflective platelet-shaped magnetic or magnetizable pigment particles described, wherein said pigment particles are fixed or frozen (fixed/frozen) in position and orientation within the material.

As shown in FIG. 1 and in contrast to needle-shaped pigment particles which can be considered as one-dimensional particles, platelet-shaped pigment particles are quasi two-dimensional particles due to the large aspect ratio of their dimensions. A platelet-shaped pigment particle can be considered as a two-dimensional structure wherein the dimensions along axes X and Y are substantially larger than dimension along axis Z (i.e. thickness). Platelet-shaped pigment particles are also referred in the art as oblate particles or flakes.

The oriented reflective platelet-shaped magnetic or magnetizable pigment particles, due to their flat shape, have non-isotropic reflectivity. As used herein, the term "non-isotropic reflectivity" denotes that the proportion of incident radiation from a first angle that is reflected by a particle into a certain (viewing) direction (a second angle) is a function of the orientation of the particles, i.e. that a change of the orientation of the particle with respect to the first angle can lead to a different magnitude of the reflection to the viewing direction. Preferably, the reflective platelet-shaped magnetic or magnetizable pigment particles described herein have a non-isotropic reflectivity with respect to incident electromagnetic radiation in some parts or in the complete wavelength range of from about 400 to about 1000 nm (i.e. from the visible to the NIR wavelengths), more preferably from about 400 to about 700 nm (i.e. visible range), such that a change of the particle's orientation results in a change of reflection by that particle into a certain direction. Thus, even if the intrinsic reflectivity per unit surface area (e.g. per μm2) is uniform across the whole surface of platelet-shaped particle, due to its shape, the reflectivity of the particle is non-isotropic as the visible area of the particle depends on the direction from which it is viewed. As known by the skilled person in the art, the reflective platelet-shaped magnetic or magnetizable pigment particles described herein are different from conventional pigments, in that said conventional pigment particles exhibit the same color and reflectivity, independent of the particle orientation, whereas the magnetic or magnetizable pigment particles described herein exhibit either a reflection or a color, or both, that depend on the particle orientation within the material of the layer. The platelet-shaped pigment particles, originally randomly distributed within the layer of material, have been oriented by application of a strong (uniform) magnetic field through the layer and then fixed/frozen in position by a subsequent hardening of the material of the layer. The platelet-shaped pigment particles have then their flat faces preferably oriented in the (mono-axial) direction of the applied magnetic field according to a statistical distribution with a sharp peak (e.g. like a gaussian). The pigment particles are thus statistically oriented and have their planar faces with a corresponding elevation angle with respect to a plane of the layer. An angle between two planes is by definition the angle between the vectors normal to the respective planes, it is also the angle between two straight lines of the respective panes which are perpendicular to the (straight) line at the intersection of the two planes. Here, the straight line along the planar face of an oriented pigment particle is (substantially, according to the statistical distribution) aligned with the direction of orientation of said pigment particle. A full width at half maximum (FWHM) of this statistical distribution allows to estimate a corresponding standard deviation for the orientations of the flat faces with respect to the direction of the magnetic field lines. Thus, the normal direction to a face of an (mono-axially) oriented platelet-shaped pigment particle may have a tilt angle around the mono-axial direction of orientation which is in practice less than 30°. In order to have a better relative orientation of the faces of the different pigment particles (i.e. to reduce the tilt angle and thus, have a better relative parallelism of the faces), a second magnetic field is applied (before hardening) with its field lines oriented in a second direction (for example along the Y axis shown of FIG. 1): with such a bi-axial orientation of the faces of the pigment particles the above mentioned standard deviation is strongly reduced and the faces of the pigment particles are (statistically) parallel to each other while being still oriented in a given direction corresponding to the elevation angle. In the preferred embodiments of the invention, a bi-axial magnetically induced layer is used, wherein the faces of the pigment particles in each zone of the magnetically induced layer are bi-axially oriented.

Suitable examples of platelet-shaped magnetic or magnetizable pigment particles include without limitation pigment particles comprising a magnetic metal selected from the group consisting of cobalt (Co), iron (Fe), and nickel (Ni); a magnetic alloy of iron, manganese, cobalt, nickel or a mixture of two or more thereof; a magnetic oxide of chromium, manganese, cobalt, iron, nickel or a mixture of two or more thereof; or a mixture of two or more thereof. The term "magnetic" in reference to the metals, alloys and oxides is directed to ferromagnetic or ferrimagnetic metals, alloys and oxides. Magnetic oxides of chromium, manganese, cobalt, iron, nickel or a mixture of two or more thereof may be pure or mixed oxides. Examples of magnetic oxides include without limitation iron oxides such as hematite (Fe2O3), magnetite (Fe3O4), chromium dioxide (CrO2), magnetic ferrites (MFe2O4), magnetic spinels (MR2O4), magnetic hexaferrites (MFe12O19), magnetic orthoferrites (RFeO3), magnetic garnets M3R2(AO4)3, wherein M stands for two-valent metal, R stands for three-valent metal, and A stands for four-valent metal.

Other examples of platelet-shaped, magnetic or magnetizable pigment particles include without limitation pigment particles comprising a magnetic layer M made from one or more of a magnetic metal such as cobalt (Co), iron (Fe), or nickel (Ni); and a magnetic alloy of iron, cobalt or nickel, wherein said magnetic or magnetizable pigment particles may be multilayered structures comprising one or more additional layers. Preferably, the one or more additional layers are layers A independently made from one or more selected from the group consisting of metal fluorides such as magnesium fluoride (MgF2), silicon oxide (SiO), silicon dioxide (SiO2), titanium oxide (TiO2), and aluminum oxide (Al2O3), more preferably silicon dioxide (SiO2); or layers B independently made from one or more selected from the group consisting of metals and metal alloys, preferably selected from the group consisting of reflective metals and reflective metal alloys, and more preferably selected from the group consisting of aluminum (Al), chromium (Cr), and nickel (Ni), and still more preferably aluminum (Al); or a combination of one or more layers A such as those described hereabove and one or more layers B such as those described hereabove. Typical examples of the platelet-shaped magnetic or magnetizable pigment particles being multilayered structures described hereabove include without limitation A/M multilayer structures, A/M/A multilayer structures, A/M/B multilayer structures, A/B/M/A multilayer structures, A/B/M/B multilayer structures, A/B/M/B/A/multilayer structures, B/M multilayer structures, B/M/B multilayer structures, B/A/M/A multilayer structures, B/A/M/B multilayer structures, B/A/M/B/A/multilayer structures, wherein the layers A, the magnetic layers M and the layers B are chosen from those described hereabove.

According to one embodiment, at least a part of the preferred platelet-shaped, magnetic or magnetizable particles is constituted by platelet-shaped optically variable magnetic or magnetizable pigment particles. Optically variable pigments refers to pigment exhibiting a change of lightness or a combination of a change of lightness and a change of hue. According to one embodiment, at least a part of the platelet-shaped, magnetic or magnetizable particles is constituted by particles exhibiting a metallic color, more preferably a silver color or a gold color.

Preferably, the platelet-shaped, magnetic or magnetizable pigment particles are selected from the group consisting of magnetic thin-film interference pigment particles, magnetic cholesteric liquid crystal pigment particles, interference coated pigment particles comprising a magnetic material and mixtures of two or more thereof.

Magnetic thin film interference pigment particles are known to those skilled in the art and are disclosed e.g. in U.S. Pat. No. 4,838,648; WO 2002/073250 A2; EP 0 686 675 B1; WO 2003/000801 A2; U.S. Pat. No. 6,838,166; WO 2007/131833 A1; EP 2 402 401 B1; WO 2019/103937 A1; WO 2020/006286 A1 and in the documents cited therein. Preferably, the magnetic thin film interference pigment particles comprise pigment particles having a five-layer Fabry-Perot multilayer structure and/or pigment particles having a six-layer Fabry-Perot multilayer structure and/or pigment particles having a seven-layer Fabry-Perot multilayer structure and/or pigment particles having a multilayer structure combining one or more multilayer Fabry-Perot structures.

Preferred five-layer Fabry-Perot multilayer structures consist of absorber/dielectric/reflector/dielectric/absorber multilayer structures wherein the reflector and/or the absorber is also a magnetic layer, preferably the reflector and/or the absorber is a magnetic layer comprising nickel, iron and/or cobalt, and/or a magnetic alloy comprising nickel, iron and/or cobalt and/or a magnetic oxide comprising nickel (Ni), iron (Fe) and/or cobalt (Co).

Preferred six-layer Fabry-Perot multilayer structures consist of:
  absorber/dielectric/reflector/magnetic/dielectric/absorber multilayer structures.

Preferred seven-layer Fabry Perot multilayer structures consist of:
  absorber/dielectric/reflector/magnetic/reflector/dielectric/absorber multilayer structures such as disclosed in U.S. Pat. No. 4,838,648.

Preferred pigment particles having a multilayer structure combining one or more Fabry-Perot structures are those described in WO 2019/103937 A1 and consist of combinations of at least two Fabry-Perot structures, said two Fabry-Perot structures independently comprising a reflector layer, a dielectric layer and an absorber layer, wherein the reflector and/or the absorber layer can each independently comprise one or more magnetic materials and/or wherein a magnetic layer is sandwich between the two structures. WO 2020/006/286 A1 and EP 3 587 500 A1 disclose further preferred pigment particles having a multilayer structure.

Preferably, the reflector layers described herein are independently made from one or more selected from the group consisting of metals and metal alloys, preferably selected from the group consisting of reflective metals and reflective metal alloys, more preferably selected from the group consisting of aluminum (Al), silver (Ag), copper (Cu), gold (Au), platinum (Pt), tin (Sn), titanium (Ti), palladium (Pd), rhodium (Rh), niobium (Nb), chromium (Cr), nickel (Ni), and alloys thereof, even more preferably selected from the group consisting of aluminum (Al), chromium (Cr), nickel (Ni) and alloys thereof, and still more preferably aluminum (Al). Preferably, the dielectric layers are independently made from one or more selected from the group consisting of metal fluorides such as magnesium fluoride (MgF2), aluminum fluoride (AlF3), cerium fluoride (CeF3), lanthanum fluoride (LaF3), sodium aluminum fluorides (e.g. Na3AlF6), neodymium fluoride (NdF3), samarium fluoride (SmF3), barium fluoride (BaF2), calcium fluoride (CaF2), lithium fluoride (LiF), and metal oxides such as silicon oxide (SiO), silicium dioxide (SiO2), titanium oxide (TiO2), aluminum oxide (Al2O3), more preferably selected from the group consisting of magnesium fluoride (MgF2) and silicon dioxide (SiO2) and still more preferably magnesium fluoride (MgF2). Preferably, the absorber layers are independently made from one or more selected from the group consisting of aluminum (Al), silver (Ag), copper (Cu), palladium (Pd), platinum (Pt), titanium (Ti), vanadium (V), iron (Fe) tin (Sn), tungsten (W), molybdenum (Mo), rhodium (Rh), Niobium (Nb), chromium (Cr), nickel (Ni), metal oxides thereof, metal sulfides thereof, metal carbides thereof, and metal alloys thereof, more preferably selected from the group consisting of chromium (Cr), nickel (Ni), metal oxides thereof, and metal alloys thereof, and still more preferably selected from the group consisting of chromium (Cr), nickel (Ni), and metal alloys thereof. Preferably, the magnetic layer comprises nickel (Ni), iron (Fe) and/or cobalt (Co); and/or a magnetic alloy comprising nickel (Ni), iron (Fe) and/or cobalt (Co); and/or a magnetic oxide comprising nickel (Ni), iron (Fe) and/or cobalt (Co).

When magnetic thin film interference pigment particles comprising a seven-layer Fabry-Perot structure are preferred, it is particularly preferred that the magnetic thin film interference pigment particles comprise a seven-layer Fabry-Perot absorber/dielectric/reflector/magnetic/reflector/dielectric/absorber multilayer structure consisting of a Cr/MgF2/Al/Ni/Al/MgF2/Cr multilayer structure.

The magnetic thin film interference pigment particles described herein may be multilayer pigment particles being considered as safe for human health and the environment and being based for example on five-layer Fabry-Perot multilayer structures, six-layer Fabry-Perot multilayer structures and seven-layer Fabry-Perot multilayer structures, wherein said pigment particles include one or more magnetic layers comprising a magnetic alloy having a substantially nickel-free composition including about 40 wt-% to about 90 wt-% iron, about 10 wt-% to about 50 wt-% chromium and about 0 wt-% to about 30 wt-% aluminum. Typical examples of multilayer pigment particles being considered as safe for human health and the environment can be found in EP 2 402 401 B1 whose content is hereby incorporated by reference in its entirety.

Suitable magnetic cholesteric liquid crystal pigment particles exhibiting optically variable characteristics include without limitation magnetic monolayered cholesteric liquid crystal pigment particles and magnetic multilayered cholesteric liquid crystal pigment particles. Such pigment particles are disclosed for example in WO 2006/063926 A1, U.S. Pat. Nos. 6,582,781 and 6,531,221. WO 2006/063926 A1 discloses monolayers and pigment particles obtained therefrom with high brilliance and color-shifting properties with additional particular properties such as magnetizability. The disclosed monolayers and pigment particles, which are obtained therefrom by comminuting said monolayers, include a three-dimensionally crosslinked cholesteric liquid crystal mixture and magnetic nanoparticles. U.S. Pat. Nos. 6,582,781 and 6,410,130 disclose platelet-shaped cholesteric multilayer pigment particles which comprise the sequence A1/B/A2, wherein A1 and A2 may be identical or different and each comprises at least one cholesteric layer, and B is an interlayer absorbing all or some of the light transmitted by the layers A1 and A2 and imparting magnetic properties to said interlayer. U.S. Pat. No. 6,531,221 discloses platelet-shaped cholesteric multilayer pigment particles which comprise the sequence A/B and optionally C, wherein A and C are absorbing layers comprising pigment particles imparting magnetic properties, and B is a cholesteric layer.

Suitable interference coated pigment particles comprising one or more magnetic materials include without limitation structures consisting of a substrate selected from the group consisting of a core coated with one or more layers, wherein at least one of the core or the one or more layers have magnetic properties. For example, suitable interference coated pigment particles comprise a core made of a magnetic material such as those described hereabove, said core being coated with one or more layers made of one or more metal oxides, or they have a structure consisting of a core made of synthetic or natural micas, layered silicates (e.g. talc, kaolin and sericite), glasses (e.g. borosilicates), silicon dioxides (SiO2), aluminum oxides (Al2O3), titanium oxides (TiO2), graphites and mixtures of two or more thereof. Furthermore, one or more additional layers such as coloring layers may be present.

The platelet-shaped, magnetic or magnetizable pigment particles described herein preferably have a size d50 between about 2 μm and about 50 μm (as measured by direct optical granulometry).

The platelet-shaped magnetic or magnetizable pigment particles described herein may be surface treated so as to protect them against any deterioration that may occur in the coating composition and coating layer and/or to facilitate their incorporation in said coating composition and coating layer; typically corrosion inhibitor materials and/or wetting agents may be used.

The magnetically induced layer (120) described herein is prepared by a process comprising the steps of a) applying a coating composition comprising the reflective platelet-shaped magnetic or magnetizable pigment particles described herein; b) exposing the coating composition to the magnetic field of a magnetic-field-generating device, thereby orienting at least a part of the reflective platelet-shaped magnetic or magnetizable pigment particles, and c) hardening the coating composition so as to fix the reflective platelet-shaped magnetic or magnetizable pigment particles in their adopted positions and orientations.

Preferably, the coating composition described herein comprises the reflective platelet-shaped magnetic or magnetizable pigment particles described herein dispersed in a binder material, wherein said reflective platelet-shaped magnetic or magnetizable pigment particles are present in an amount from about 2 wt-% to about 40 wt-%, more preferably about 4 wt-% to about 30 wt-%, the weight percents being based on the total weight of the coating composition comprising the binder material, the reflective platelet-shaped magnetic or magnetizable pigment particles and other optional components of the coating composition. The coating composition described herein may further comprise one or more coloring components selected from the group consisting of organic pigment particles, inorganic pigment particles, and organic dyes, and/or one or more additives. The latter include without limitation compounds and materials that are used for adjusting physical, rheological and chemical parameters of the coating composition such as the viscosity (e.g. solvents, thickeners and surfactants), the consistency (e.g. anti-settling agents, fillers and plasticizers), the foaming properties (e.g. antifoaming agents), the lubricating properties (waxes, oils), UV stability (photostabilizers), the adhesion properties, the antistatic properties, the storage stability (polymerization inhibitors) etc. Additives described herein may be present in the coating composition in amounts and in forms known in the art, including so-called nano-materials where at least one of the dimensions of the additive is in the range of 1 to 1000 nm.

The applying step a) described in the preceding paragraph is carried out by a printing process preferably selected from the group consisting of screen printing, rotogravure printing and flexography printing. These processes are well-known to the skilled person and are described for example in Printing Technology, J. M. Adams and P. A. Dolin, Delmar Thomson Learning, 5th Edition, p 293, 332, and 352. While the coating composition comprising the reflective platelet-shaped magnetic or magnetizable pigment particles described herein is still wet or soft enough so that said pigment particles therein can be moved and rotated (i.e. while the coating composition is in a first state), the coating composition is subjected to a magnetic field to achieve orientation of the particles. The step of magnetically orienting the reflective platelet-shaped magnetic or magnetizable pigment particles comprises a step of exposing the applied coating composition, while it is "wet" (i.e. still liquid and not too viscous), to a determined magnetic field generated by the magnetic-field-generating device, thereby orienting the reflective platelet-shaped magnetic or magnetizable pigment particles along the field lines of the magnetic field such as to form an orientation pattern. Subsequently to, partially simultaneously or simultaneously with the application of the coating composition, the reflective platelet-shaped magnetic or magnetizable pigment particles are oriented by the use of an external magnetic field for orienting them according to a desired orientation pattern. The so-obtained orientation pattern may be any pattern except a random orientation and except a pattern wherein the reflective platelet-shaped magnetic or magnetizable pigment particles have their magnetic axis oriented to be parallel or perpendicular to the layer (120).

The processes for producing the magnetically induced layer (120) described herein comprise, partially simultaneously with step b) or subsequently to step b), a step c) of hardening the coating composition so as to fix the partially reflective platelet-shaped magnetic or magnetizable pigment particles in their adopted positions and orientations in a desired pattern to form the magnetically induced layer, thereby transforming the coating composition to a second state. By this fixing, a solid coating or layer is formed. The term "hardening" refers to processes including the drying or solidifying, reacting, curing, cross-linking or polymerizing the binder components in the applied coating composition, including an optionally present cross-linking agent, an optionally present polymerization initiator, and optionally present further additives, in such a manner that an essentially solid material that adheres to the surface onto which is formed. As mentioned herein, the hardening step c) may be performed by using different means or processes depending on the materials comprised in the coating composition that also comprises the reflective platelet-shaped magnetic or magnetizable pigment particles. The hardening step generally may be any step that increases the viscosity of the coating composition such that a substantially solid material adhering to the supporting surface is formed. The hardening step may involve a physical process based on the evaporation of a volatile component, such as a solvent, and/or water evaporation (i.e. physical drying). Herein, hot air, infrared or a combination of hot air and infrared may be used. Alternatively, the hardening process may include a chemical reaction, such as a curing, polymerizing or cross-linking of the binder and optional initiator compounds and/or optional cross-linking compounds comprised in the coating composition. Such a chemical reaction may be initiated by heat or IR irradiation as outlined above for the physical hardening processes, but may preferably include the initiation of a chemical reaction by a radiation mechanism including without limitation Ultraviolet-Visible light radiation curing (hereafter referred as UV-Vis curing) and electronic beam radiation curing (E-beam curing); oxypolymerization (oxidative reticulation, typically induced by a joint action of oxygen and one or more catalysts preferably selected from the group consisting of cobalt-containing catalysts, vanadium-containing catalysts, zirconium-containing catalysts, bismuth-containing catalysts, and manganese-containing catalysts); cross-linking reactions or any combination thereof. Radiation curing is particularly preferred, and UV-Vis light radiation curing is even more preferred, since these technologies advantageously lead to very fast curing processes and hence drastically decrease the preparation time of any document comprising the magnetically induced layers described herein. Moreover, radiation curing has the advantage of producing an almost instantaneous increase in viscosity of the coating composition after exposure to the curing radiation, thus minimizing any further movement of the particles. In consequence, any loss of information after the magnetic orientation step can essentially be avoided. Particularly preferred is radiation-curing by photo-polymerization, under the influence of actinic light having a wavelength component in the UV-Vis electromagnetic spectrum. Equipment for UV-visible-curing may comprise a continuous or pulsed laser (e.g. GaN), a high-power light-emitting-diode (LED) lamp, or an arc discharge lamp, such as a medium-pressure mercury arc (MPMA) or a metal-vapor arc lamp, as the source of the actinic radiation.

Should a primer (140), preferably a dark primer and more preferably a black primer, be present between the substrate (110) and the magnetically induced layer (120), a step of applying and hardening a primer composition is carried out prior to the preparation of said magnetically induced layer (120). The primer composition described herein may be applied by a large variety of coating processes, preferably selected form the group consisting of inkjet printing processes, offset printing processes, flexography printing processes, gravure printing processes, screen printing processes, pad printing processes and roller-coating processes.

The magnetically induced layers (120) described herein comprise (at least) two zones (see FIG. 2A), a first zone (120a) comprising magnetically oriented reflective platelet-shaped magnetic or magnetizable pigment particles having their planar faces oriented in a first direction and having a first elevation angle $\gamma_1$ with respect to the substrate (110), corresponding to the angle between said planar faces and the plane of the substrate (110), and a second zone (120b), distinct from the first zone (120a), comprising magnetically oriented reflective platelet-shaped magnetic or magnetizable pigment particles having their planar faces oriented in a second direction distinct from the first direction and having a second elevation angle $\gamma_2$ with respect to the substrate (110), corresponding to the angle between said planar faces and the plane of the substrate (110). In order to have a definition of the elevation angles in the two zones of the magnetically induced layer which is consistent with a common counterclockwise direction of rotation corresponding to some given right-handed orthonormal triad defined on the reference plane of (the top face of) the substrate (e.g. with x and y axes lying in the plane and the z axis oriented outwardly), the elevation angle $\gamma_1$ of a planar face of a pigment particle in the first zone is the angle between the plane of the substrate and the plane of the face counted counterclockwise, i.e. for a positive rotation around the straight line $L_1$ of intersection of the planar face and the reference plane (from the reference plane toward the planar face), while the elevation angle $\gamma_2$ of a planar face of a pigment particle in the second zone is the angle between the plane of the substrate and the plane of the face still counted counterclockwise, but this time for a positive rotation around a straight matching line obtained by rotation in the reference plane of the straight line $L_2$ of intersection of the planar face and the reference plane so as to align it the line $L_1$. This method of determining the elevation angles in the two distinct zones of orientation of the particles facilitates an unambiguous comparison of elevation angles and directions of orientations. In each zone of the magnetically induced layer (120), in agreement with the experimental tests performed according to the invention, the acute angles of the planar faces with respect to the plane of the substrate (110) are preferably in a range from about 5° to about 25°. Moreover, as a result of said experimental tests, the two distinct orientation directions of the planar faces in the two zones (120a) and (120b) are preferably at an angle of at least 30° in order to have an acceptable contrast between the two zones when the illuminated security marking (100) is observed under two viewing angles respectively corresponding to a best reflection of light from the first zone and the second zone. In the example shown on FIG. 2, wherein in each zone (120a, 120b) the faces of the pigment particles are substantially parallel to each other (i.e. the normals to the faces in each zone are substantially parallel, see on FIG. 2A), the first elevation angle $\gamma_1$, when measured in a counterclockwise direction as specified above, has a value which is in the range from about 5° to about 25° ($5° \leq \gamma_1 \leq 25°$), preferably from about 5° to about 20° ($5° \leq \gamma_1 \leq 20°$), and the second elevation angle $\gamma_2$, when measured in a counterclockwise direction as specified above, has a value in the range from about 155° to about 175° ($155° \leq \gamma_2 \leq 175°$), more preferably from about 160° to about 175° ($160° \leq \gamma_2 \leq 175°$). The acute angle formed by the faces of the pigment particles within the second zone (120b) of the induced magnetic layer (120), i.e. the angle complementary to the elevation angle $\gamma_2$, is thus in the range from about 5° (as 180°−175°=5°) to about 25° (as 180°−155°=25°).

Figure 2B:
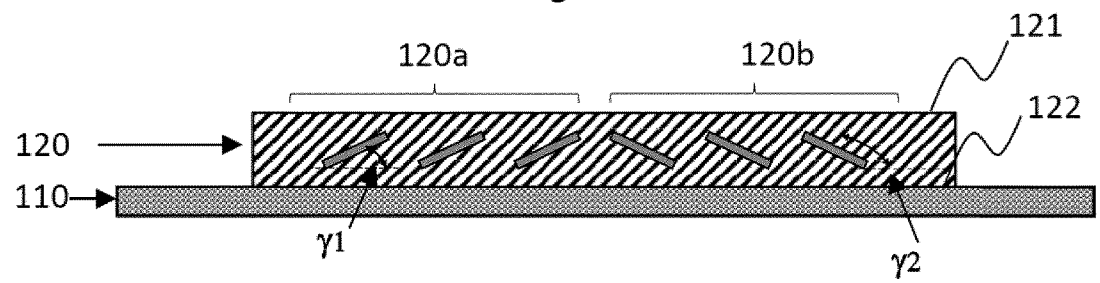
FIG. 2B schematically illustrates a cross-section of the magnetically induced layer (120) of FIG. 1 comprising magnetically oriented platelet-shaped magnetic or magnetizable pigment particles within a single layer of a material applied on a flat substrate (110). The magnetically induced layer (120) comprises two distinct zones (120a, 120b) in the single layer (120) wherein reflective pigment particles have the different elevation angles $\gamma_1$ and $\gamma_2$.
Figure 2C:
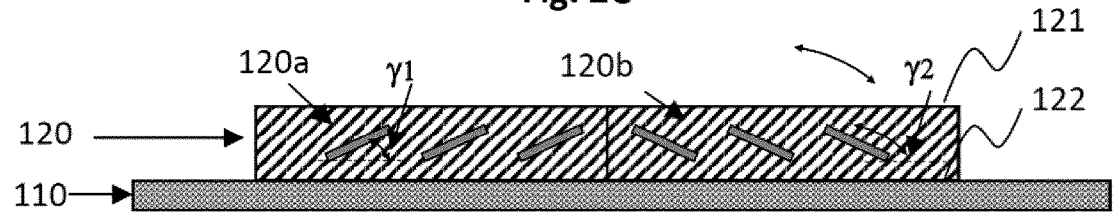
FIG. 2C schematically illustrate cross-sections of a magnetically induced layer (120) according an embodiment of the invention comprising magnetically oriented platelet-shaped magnetic or magnetizable pigment particles in two layers on a flat substrate (110). The magnetically induced layer (120) comprises two zones, wherein a first zone (120a) is a first layer of a material comprising magnetically oriented reflective platelet-shaped magnetic or magnetizable pigment particles having a first elevation angle $\gamma_1$ and a second zone (120b) is a second layer of a material comprising magnetically oriented reflective platelet-shaped magnetic or magnetizable pigment particles having a second elevation angle $\gamma_2$, wherein the first and second layers have abutting edges.

In the embodiment shown on FIG. 2B, the magnetically induced layer (120) comprises magnetically oriented platelet-shaped magnetic or magnetizable pigment particles within a single layer of a material applied on the flat substrate (110). In the embodiment shown on FIG. 2C, the magnetically induced layer (120) comprises two distinct sub-layers respectively forming the two zones (120a) and (120b), wherein said first sub-layer and second sub-layer are adjacent, i.e. have abutting edges forming a common border. According to another embodiment (not shown in FIG. 2C), the two distinct sub-layers respectively forming the two zones (120a) and (120b) are spaced apart from each other.

Instead of using the magnetically induced layer comprising the magnetically oriented reflective platelet-shaped magnetic or magnetizable pigment particles with the elevation angles described herein, a diffractive, reflective, refractive micro-structure may be used such as for example diffraction grating as well as layers comprising microlenses or a micromirror structure, said structure comprising micro-mirrors whose facets have the specific elevation angles described herein.

Figure 3:
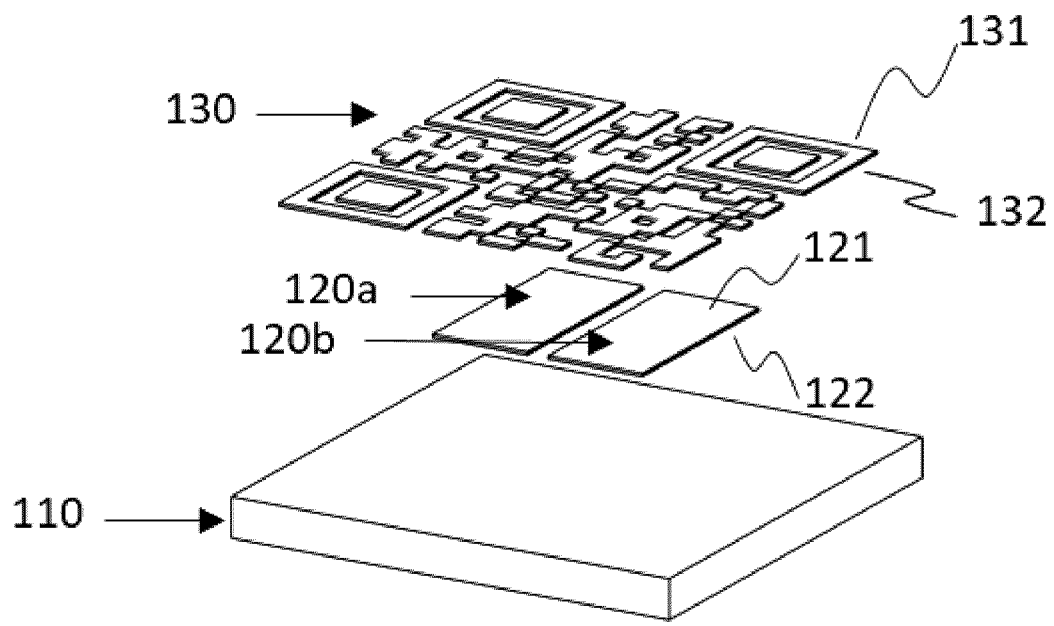
FIG. 3 schematically illustrates a perspective exploded view of a security marking (100) according to an embodiment of the invention comprising a flat substrate (110), a magnetically induced layer (120) having two zones (120a) and (120b) with distinct orientations of their magnetically oriented reflective platelet-shaped magnetic or magnetizable pigment particles, with top face (121) and rear face (122), and a machine-readable marking (130), with top face (131) and rear face (132), wherein said machine-readable marking (130) partially overlaps the magnetically induced layer (120).
Figure 4A:
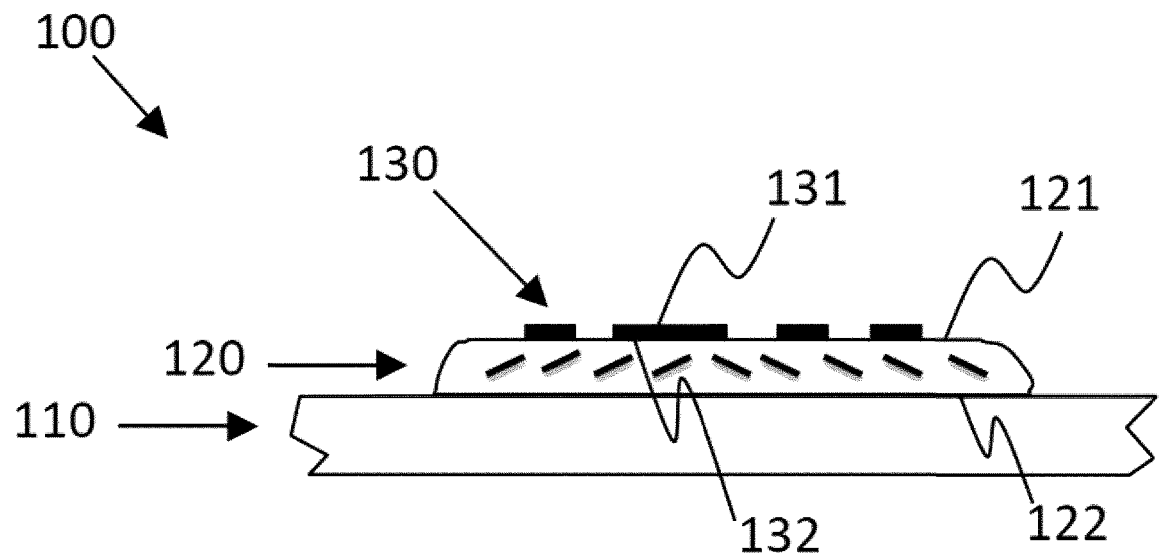
FIG. 4A schematically illustrates a cross-section of a security marking (100) comprising a flat substrate (110), a magnetically induced layer (120) with two zones applied on the substrate, and a machine-readable marking (130) printed on the top face (121) of the magnetically induced layer, wherein the machine-readable marking (130) partially overlaps the magnetically induced layer (120).
Figure 4B:
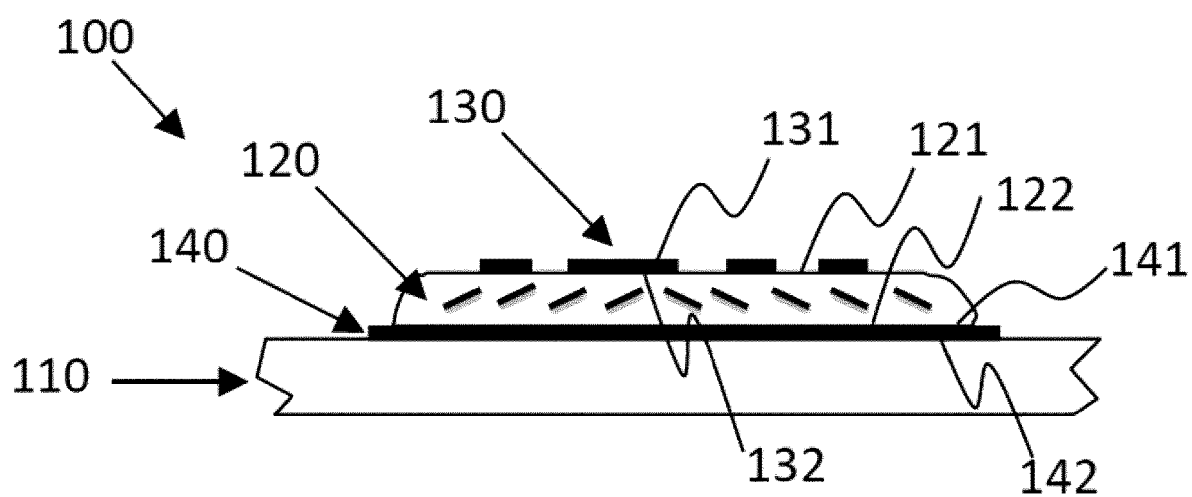
FIG. 4B schematically illustrates a cross-section of a security marking (100) comprising a flat substrate (110), a dark primer (140) with a top face (141) and a rear face (142), a magnetically induced layer (120) with two zones applied on the substrate and a machine-readable marking (130), wherein said dark primer has its rear face (142) applied on a top face of the substrate (110) and the rear face (122) of the magnetically induced layer (120) is applied on the top face (141) of the dark primer, and the machine-readable marking (130) partially overlaps the magnetically induced layer (120).
Figure 4C:
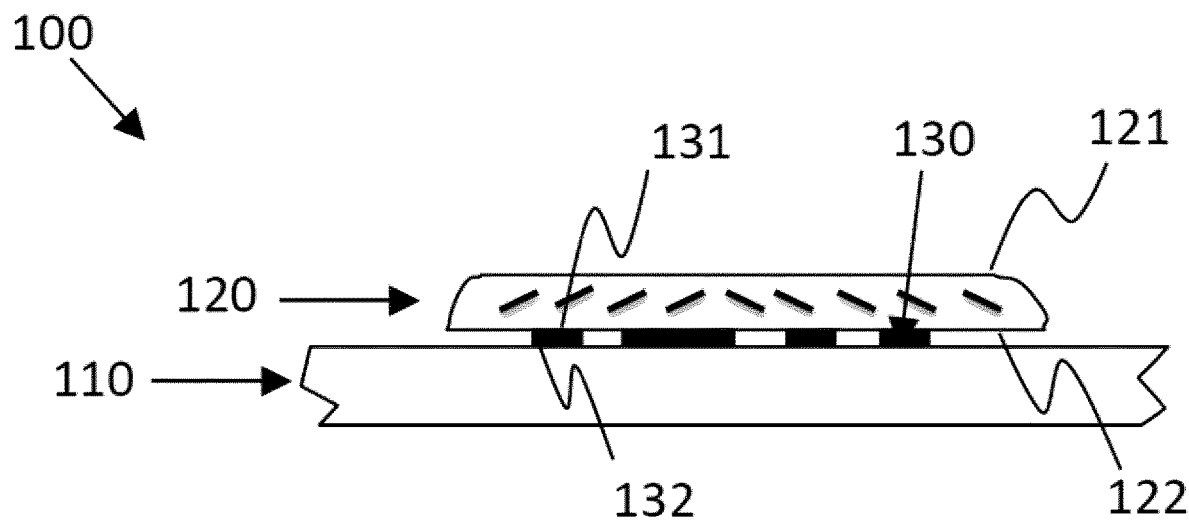
FIG. 4C schematically illustrates a cross-section of a security marking (100) comprising a flat substrate (110), a magnetically induced layer (120) and a machine-readable marking (130), wherein the machine-readable marking (130) is printed on a top face of the substrate (110) and a rear face (122) of the magnetically induced layer (120) is applied on the top face (131) of the machine-readable marking (130), and the machine-readable marking (130) partially overlaps the magnetically induced layer (120).
Figure 5A:
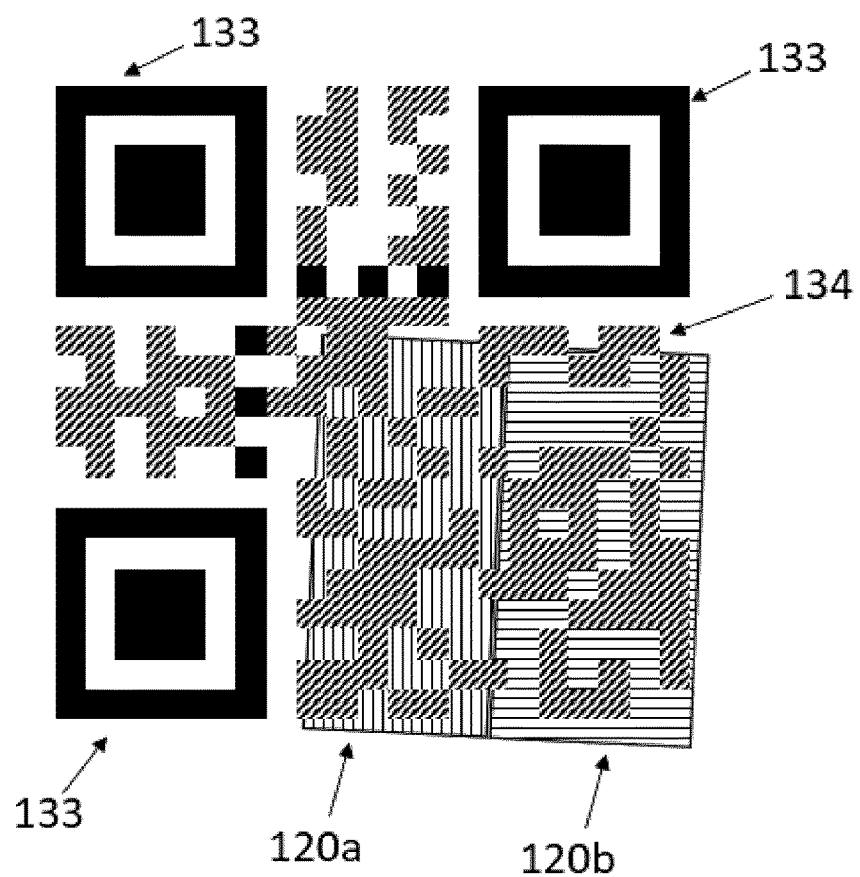
FIG. 5A illustrates a top view of an example of machine readable code (130) in the form of a small QR code with its reference pattern (133) for locating the code pattern (134) during decoding operations, and a first area above a first zone (120a) of a magnetically induced layer and a second area above a second zone (120b) of the magnetically induced layer (shown on FIG. 3).
Figure 5B:
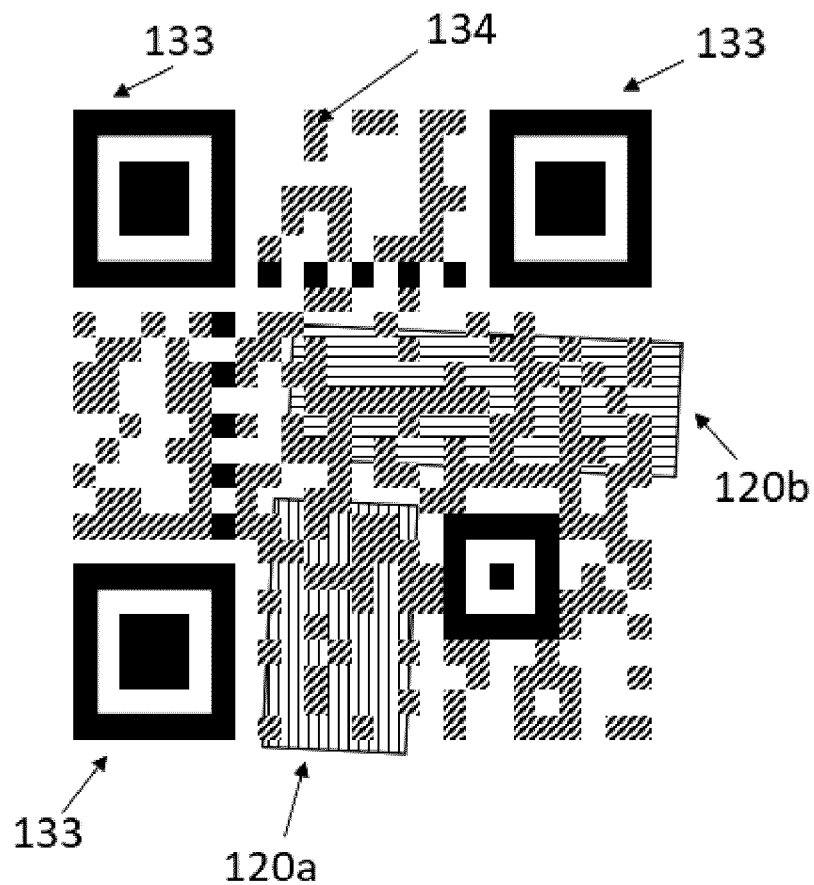
FIG. 5B illustrates a top view of an example of machine readable code (130) in the form of a large QR code with its reference pattern (133) for locating the code pattern (134) during decoding operations, and a first area above a first zone (120a) of a magnetically induced layer and a second area above a second zone (120b) of the magnetically induced layer (shown on FIG. 3).
Figure 5C:
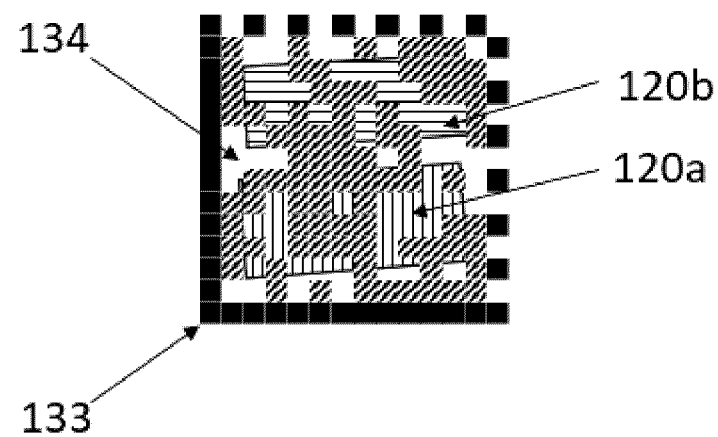
FIG. 5C illustrates a top view of an example of machine readable code (130) in the form of a datamatrix with its reference pattern (133) having a L-shape for locating the code pattern (134) during decoding operations, and a first area (134a) above a first zone (120a) of a magnetically induced layer and a second area (134b) above a second zone (120b) of the magnetically induced layer (shown on FIG. 2).

According to the invention, as illustrated on FIG. 3-5, a machine readable marking (130), in the form of a two-dimensional barcode, including a reference pattern (133), and a code pattern (134) representing encoded data, is applied either on a top face (121) of the magnetically induced layer (120) or on the substrate (110), between said substrate (110) and a rear face (122) of the magnetically induced layer (120), a first area (134a) of the code pattern being disposed in front of the first zone (120a) and a remaining second area (134b) of the code pattern (134) being disposed in front of the second zone (120b). The reference pattern (133) is used for precisely locating the code pattern (134) during image processing operations when reading and decoding the machine readable marking (130). FIG. 5B illustrates an embodiment with a QR code and its characteristic reference pattern (133) in the form of three squares. FIG. 5C illustrates an embodiment with a datamatrix code with its L-shaped reference pattern (133). Other machine readable code formats (e.g. dot matrix) can be used for the invention with their reference patterns. It is also possible to use a machine readable marking wherein the reference pattern is marked separately from the code pattern in an area external to the magnetically induced layer (but must still be within the field of view of the reader while reading the machine readable marking).

The machine readable marking (130) described herein may be produced by any suitable means including printing processes (in particular inkjet printing), etching and ablation methods (in particular laser etching or burning), embossing methods, etc.

FIG. 3 is an exploded view of a security marking (100) according to an embodiment of the invention comprising a flat substrate (110), a magnetically induced layer (120) having two zones (120a) and (120b) with distinct orientations of their magnetically oriented reflective platelet-shaped magnetic or magnetizable pigment particles, with top face (121) and rear face (122), and a machine-readable marking (130) in the form of a QR code, with top face (131) and rear face (132), wherein said machine-readable marking (130) partially overlaps the magnetically induced layer (120). Here, the machine readable marking (130) is applied on top of the magnetically induce layer (120) applied on the substrate (110). A first area (134a) of the code pattern (134) is disposed in front of the first zone (120a) and a second area (134b) of the code pattern (134) is disposed in front of the second zone (120b). An effect of the invention is that it is necessary to take two distinct images of the machine readable marking (130), at two distinct viewing angles in order to acquire the full encoded data from the code pattern, the viewing angles respectively corresponding to the elevation angles and orientations of the pigment particles within the two zones (120a) and (120b). Indeed, due to the difference in reflectivity of light of the two zones (120a) and (120b) of the magnetically induced layer (120) when imaged under a single viewing angle, only one part of the imaged code pattern can be reliably detected, i.e. the part of the code pattern corresponding to area of the code pattern which is in front of the zone of the magnetically induced layer providing the best contrast (if the viewing angle is the right one corresponding to the elevation angle of the faces of the pigment particles within said zone, as the elevation angle of a face of a pigment particle sets the viewing angle at which specular reflection of light from the face is maximum for a given position of the light source). It is thus not possible to obtain the required contrast for detection of the encoded data simultaneously, from a single viewing angle, for both areas (134a) and (134b) of the code pattern (134). In order to reliably detect the full encoded data, it is necessary to first acquire two images of the machine readable marking (130), at two distinct viewing angles adapted to the respective elevation angles of the faces of the pigment particles in first zone (120a) and the second zone (120b) of the magnetically induced layer (120), to obtain on each image only a corresponding part of the code pattern (130) that can be reliably detected, and secondly reconstruct an image of the full code pattern from these two acquired images in order to reassemble the two detected parts of the code pattern. The reconstruction necessitates using the imaged reference pattern (133) in order to have a common reference position element on the two images to precisely reassemble the two detected parts and reconstitute a decodable image of the full code pattern (130). In case such a reconstruction is possible, it implicitly means that the imaging operations have been performed in accordance with the very specific structure of the security marking, and thus that the secure marking (100) is most probably genuine: this is a further advantage of the invention.

FIG. 4A-C illustrate different embodiments of the security marking (100) according to the invention. In the example of FIG. 4A showing a cross-section of a security marking (100), the magnetically induced layer (120) is applied on the substrate (110), and the machine-readable marking (130), is applied on the top face (121) of the magnetically induced (mono)layer (120), with the machine-readable marking (130) partially overlapping the magnetically induced layer (120).

In the example of FIG. 4B showing a cross-section of a security marking (100), a dark primer (140) (preferably a black primer) is disposed between the substrate (110) and the magnetically induced layer (120): the dark primer (140) has its rear face (142) applied on the top face of the substrate (110), and the rear face (122) of the magnetically induced layer (120) is applied on the top face (141) of the dark primer, with the machine-readable marking (130), possibly encoded either with bright symbols or with dark symbols, partially overlapping the magnetically induced layer (120).

In the example of FIG. 4C showing a cross-section of a security marking (100), the machine-readable marking (130) is applied on the top face of the substrate (110), preferably encoded with dark symbols, and a rear face (122) of the magnetically induced layer (120) is applied on the top face (131) of the machine-readable marking (130), with the machine-readable marking (130) partially overlapping the magnetically induced layer (120).

As explained above, reading and decoding the two-zone magnetically induced layer (120) necessitates taking (at least) two images of the security marking (100). According to the invention, the method for reading and decoding the security marking (100) uses a portable device (200), as illustrated on FIG. 6 (e.g. a smartphone), equipped with a light source (201) to deliver illumination light, preferably in the visible or NIR spectrum (i.e. for wavelengths from 400 nm to 1000 nm), an imager (202) to take digital images (e.g. a camera of the smartphone), and a processor (not shown) equipped with a memory (not shown) and adapted to perform image processing and decoding operations, and comprises the steps of:

(i) illuminating the security marking (100), disposed within a field of view of the imager (202), with illumination light delivered by the light source (201). For example, the light source is a LED ("Light Emitting Diode") flash of a smartphone, which is adjacent to the imager (a camera of the smartphone).

(ii) acquiring a first digital image of the security marking (100) with the imager (202) at a first viewing angle $\theta_1$, associated with the first elevation angle $\gamma_1$ of the pigment particles in the first zone (120a) of the magnetically induced layer (120), and storing the acquired first digital image in the memory. With the above example of a smartphone, with the imager very close to the (quasi point-like) light source, the viewing angle $\theta_1$ at which an intensity of the light reflected by the faces of the pigment particles in the first zone (120a) is maximum corresponds to a position of the imager substantially in a direction normal to the faces of the pigment particles in the first zone (120a). With this viewing angle $\theta_1$, only the portion of the code pattern (134) which is applied on the first zone (120a) of the magnetically induced layer (120) can be reliably read (with good contrast) on the first digital image, as the portion of the code pattern (134) which is applied on the second zone (120b) of the magnetically induced layer (120) does not reflect enough light ($\theta_1$ being not adapted to the elevation angle $\gamma_2$).

(iii) acquiring a second digital image of the security marking (100) with the imager (202) at a second viewing angle $\theta_2$, associated with the second elevation angle $\gamma_2$ of the pigment particles in the second zone (120b) of the magnetically induced layer (120), and storing the acquired second digital image in the memory. With the above example of the smartphone of which imager is very close to the light source, the viewing angle $\theta_2$ at which an intensity of the light reflected by the faces of the pigment particles in the second zone (120b) is maximum corresponds to a position of the imager substantially in a direction normal to the faces of the pigment particles in the second zone (120b). With this viewing angle $\theta_2$, only the portion of the code pattern (134) which is applied on the second zone (120b) of the magnetically induced layer (120) can be reliably read (with good contrast) on the second digital image, as the portion of the code pattern (134) which is applied on the first zone (120a) of the magnetically induced layer (120) does not reflect enough light (02 being not adapted to the elevation angle $\gamma_1$).

(iv) forming, via image processing with the processor, a composite digital image (i.e. a reconstructed digital image) of the code pattern (134) from the stored first digital image and the stored second digital image by aligning with respect to the reference pattern (133) (detected in the first digital image and the second digital image) a first part of the code pattern (134) corresponding to the first area (134a) of the code pattern detected on the first digital image and a second part of the code pattern (134) corresponding to the second area (134b) of the code pattern detected on the second digital image, and storing the obtained composite digital image in the memory. Here, the first part of the code pattern (134) is the portion of the code pattern in the first area (134a) which is applied on the top face (121) of the first zone (120a) of the magnetically induced layer (120), and the second part of the code pattern (134) is the portion of the code pattern in the second area (134b) which is applied on the top face (121) of the second zone (120b) of the magnetically induced layer (120).

(v) reading and decoding with the processor the code pattern (134) from the stored composite digital image, i.e. from the reconstructed digital image of the full code pattern on which the two areas of the code pattern can be simultaneously and reliably detected and decoded.

As explained above, the only possibility to reliably detect and decode the machine readable marking (130) is to take two images, respectively of the first area (134a) and second area (134b) of the code pattern (134), at two viewing angles adapted to the specific orientations of the magnetically oriented reflective platelet-shaped magnetic or magnetizable pigment particles within the first zone (120a) and the second zone (120b) of the magnetically induced layer (120). The fact of being able to decode the machine readable marking of the security marking (100) implies that the two-zone structure of the magnetically induced layer (120) has been confirmed, with the viewing angles corresponding to the right elevation angles (i.e. the right orientation) of the faces of the pigment particles within the two zones (120a) and (120b). Thus, the possibility to decode the machine readable marking (130) constitutes a first level of authentication of the security marking (100).

According to the invention, a further level of authentication of the security marking (100) can be reached by exploiting in greater depth the very material properties of the security marking (100). This can be done by taking a plurality of digital images of the security marking at various viewing angles $\theta_i$ (i=1, . . . , N) while moving the imager (202) of the portable device (200) above the security marking (100) (and parallel to it) and forming from the acquired digital images, and for each zone of the magnetically induced layer, a corresponding "curve" $I(\theta_i)$ (i=1, . . . , N) of an intensity I of light reflected from said zone at said various viewing angles, upon illumination of the security marking with the light source (201). Each curve $I(\theta)$ allows to analyze in greater detail the reflectivity (as intensity is a function of reflectivity) of the magnetically oriented reflective platelet-shaped magnetic or magnetizable pigment particles within the corresponding zone of the magnetically induced layer (120). Particularly, a precise shape of the reflectivity curve $R(\theta)\sim I(\theta)$ ($R(\theta)$ being an average reflectivity) being characteristic of the nature and orientation of the pigment particles, and the material of the induced layer for the zone concerned, and showing a peak of characteristic shape around a viewing angle value associated with the elevation angle value of the pigment particles within that zone, can be compared with a reference reflectivity curve $R_{ref}(\theta)\sim I_{ref}(\theta)$ (known to the authority having delivered the security marking) in order to decide whether the shapes of the two curves are in reasonable agreement, based on a similarity criterium of curves. For example, curves can be compared using correlation. Another method is to do linear regression to estimate linear relation between measured and reference curve and evaluate how close the slope reach unity and how close the goodness of fit reach unity. Preferably, each curve $I(\theta)$ is obtained from measured average intensities I of reflected light from corresponding zone. This constitutes a strong authenticity verification of the material structure of the security marking and thus, also a verification of authenticity of the encoded data in the machine readable marking of the security marking. Another advantage of the invention, also contributing to the authentication of the secure marking, is the type of motion of the imager above the security marking to be carried out in order to properly acquire the plurality of digital images of the machine readable marking, in accordance with the relative disposition of the pigment particles within the different zones of the magnetically induced layer. For example, in case the magnetically induced layer is that shown on FIG. 2, with the directions of orientation of the pigment particles within the first zone (120a) and the second zone (120b) both comprised within a plane perpendicular to the plane of the substrate (110), a relative translational motion of the imager (202) and the security marking (100) (along a direction comprised within said perpendicular plane) is required for acquiring the plurality of digital images in order to obtain a reflectivity curve $I(\theta)$. However, with a different design of the two (or more) zones of orientation of the pigment particles of the magnetically induced layer (for example, with the directions of orientation at an angle of less than 180°, or more than 180°), the relative motion will correspond to a rotational motion. Preferably, the reflectivity curve $I(\theta)$ is obtained from measured average intensities I. However, other metrics can be used for authentication of the security marking. Further embodiments may comprise authentication algorithms based on classifier or neural network-based machine learning which are able to distinguish authentic intensity profiles (or other measured or extracted features such as variance profile or image entropy, etc.) from the ones that are not authentic.

As an example of an equivalent method for authenticating the security marking, instead of measuring the (possibly averaged) intensity of the light reflected by the magnetically induced layer to for a reflectivity curve, machine learning can be applied to the above mentioned plurality of digital images of the security marking taken at various viewing angles $\theta_i$ (i=1, . . . , N). Such a method comprises the three following steps of feature extraction, model training and selection, and prediction.

Regarding the step of feature extraction, the imager returns a series of RGB images $I(\theta)$, where $\theta_{min} \leq \theta \leq \theta_{max}$. If necessary, only a Region of Interest (RoI) around the security marking may be conserved by cropping the images. These images can be linearized and converted to gray scale (as described in R. C. Gonzalez, T. E. Woods, "Digital Image Processing", Fourth Edition, Pearsons, 2017). However, separate processing of the color channels is also possible.

For each image, one or several metric functions $f(\theta)$ are calculated. A thorough description of image metrics applied to images can be found in the above-mentioned book of R. C. Gonzales and T. E. Woods. Metrics can either be computed on the image intensity directly or on a transform, such as the Discrete Fourier Transform (DFT) or the Discrete Wavelet Transform (DWT). Among the useful metrics that can be used, we find the mean, the standard deviation and the entropy. Depending on the metric used, we may need to scale it by the average intensity of a reference adjacent RoI (this operation allows compensating for the variable exposure times of the imager and for any variations in the irradiation of the mark).

For all measurements to have the same scale, metrics must be estimated on a uniform sampling grid of angles. These angles must be symmetric about the normal to the sample.

We can denote this uniform grid as $\theta=[\theta_1 \ldots \theta_N]$, where N is the number of angles (for example N=21). In practice, scanning at uniformly-separated angles may not always be possible and interpolation of the metrics may have to be performed. At the end of the scanning procedure, we obtain the feature vector $x^T=[f(\theta_1)f(\theta_1) \ldots f(\theta_N)]=[x_1\ x_1 \ldots x_N]$. By further performing M scans on different security markings to account for their variability, we build the data set $X^T=[x_1 \ldots x_M]$, with size N×M.

Regarding the step of model training and selection, general machine learning techniques for classification and detection are described in C. M. Bishop, "Pattern Recognition and Machine Learning", Springer, 2009. Here, the authentication problem reduces to distinguishing genuine feature vectors from fakes or attacks. However, while genuine feature vectors are known and available, the others are either unknown or rare. Thus, directly training a two-class classifier is infeasible. As described in O. Mazhelis, "One-Class Classifiers: A Review and Analysis of Suitability in the Context of Mobile-Masquerader Detection," South African Computer Journal, col. 36, pp. 29-48, 2006, authentication can be shown to be equivalent to one-class classification. In this scenario, classifier models only rely on genuine feature vectors to learn their parameters and decision boundaries. Among these, Support Vector Data Description (SVDD), v-Support Vector Classification (v-SVC), Gaussian Mixture Models (GMM), and deep-learning models such as Autoencoders are of practical interest. The selection of a model is dictated by its performance during training and is also constrained by its complexity. At equivalent performance, simpler models are preferred.

Prior to training the model, the data set X is pre-processed as shown in the figure below and the following steps are carried:

Sample cleanup. Defective samples such as those saturated or with missing features are discarded.

Sample normalization. Feature vectors are normalized to unit energy.

Feature standardization. Feature mean $\mu(\theta_d)$ and feature standard deviation $\sigma(\theta_d)$ are estimated and removed feature-wise.

Sample detrending. Low-order polynomial trends of fixed order p are estimated on each sample and removed.

Feature reduction. Inter-feature correlations are removed, and the dimensionality of the problem is reduced. Here, for example the reduction can be from N=21 to K=3–5. Lower dimensionality optimization problems converge faster and allow for easier inspection. This step is accomplished through Principal Component Analysis (PCA) (see the book of C. M. Bishop, "Pattern Recognition and Machine Learning", Springer, 2009) that produces a vector subspace $V=[v_1 \ldots v_k]$, with size N×K. After PCA, we project the data set X onto subspace V, which results in the reduced-feature data set $X'^T=[x'_1 \ldots x'_N]$, with size K×N. This data set is used for learning the parameters $\Theta$ of the candidate one-class classification models. Finally, the best candidate is retained for prediction.

Regarding the step of prediction, it performs on a data set the operations of data cleanup, sample normalization, feature standardization, detrending, subspace projection, computing of a model decision function. Finally, after feature reduction by subspace projection, the decision function of the classifier with learned parameters is computed (see also I. GoodFellow, Y. Bengio, A. Courville, "Deep Learning", MIT Press, 2016).

In an example of embodiment of the above method based on reflectivity curve $I(\theta)$, relating to the example of machine readable marking (130) as a QR code (see FIGS. 3 and 5A), wherein the overlap of the magnetically induced layer (120) and the machine readable marking (130) is chosen to preserve the detection of the code reference pattern (133) and clock (in this way, the code pattern (134) can always be located although not necessarily decoded at any viewing angle). A QR Code is a well-known standardized symbology that is graphically composed in a way to allow the following three basic operations to be performed from features or graphical elements obtained from an image of the QR code:

1) Location of the code using specific graphical design (reference pattern (133)) that is robustly and precisely detectable by suitable image processing algorithms.
2) Extraction of the sampling grid and module size from a succession of alternate dark and bright modules (clock visible on FIG. 5A) disposed along one or more line(s) in the two orthogonal directions.
3) Data, encoding mode and error correction area are contained in the QR code in other regions of FIG. 5A (on the right edge). Data is encoded as bright and dark modules in a specific area of the symbol according to a specific encoding algorithm.

The machine readable code (130) of the security marking (100) is read and decoded with a portable device (200) comprising:

a light source (201) for delivering illumination light;

an imager (202) (a camera) for taking digital images of the security marking (100); and a processor equipped with a memory and adapted to perform the steps of the above method on digital images of the security marking (100) taken by the imager (202).

Figure 7:
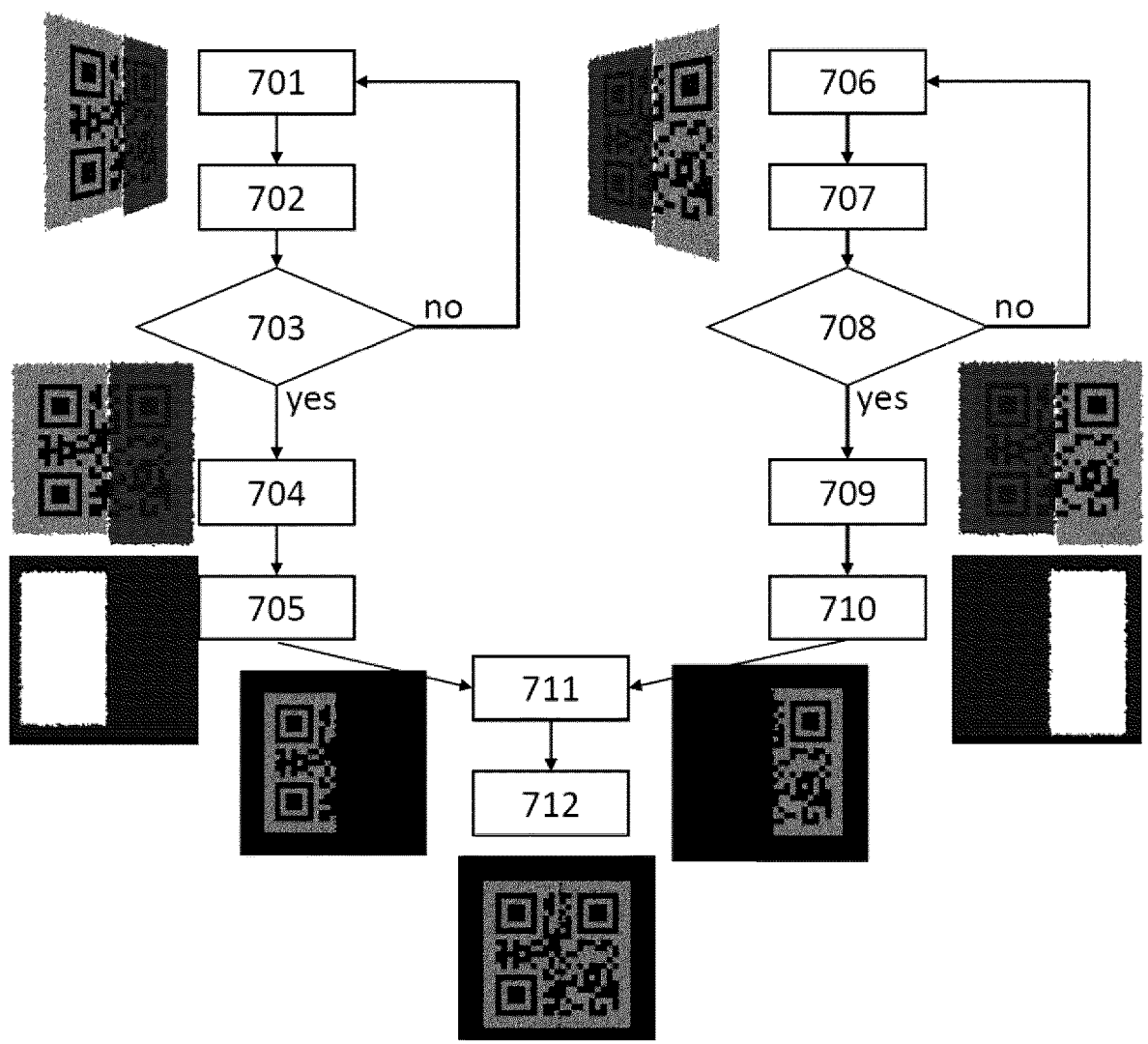
FIG. 7 is a schematic flow chart illustrating a process (700) of extraction of encoded data from the machine readable marking (130) of FIG. 5A.

As illustrated on FIG. 7, with the decoding method (700), a first sequence of digital images of the security marking (100) is acquired (701) at various viewing angles of the imager (202) relative to the security marking (100): the viewing angles being close to the first viewing angle $\theta_1$ (which is associated with the elevation angle $\gamma_1$ of the pigment particles within the first zone (120a) of the magnetically induced layer). The imager poses relative to the machine readable marking (130) are estimated (702) using the acquired sequence of digital images in a way explained below (in this context, the combination of position and orientation is referred to as the pose of an object in computer vision). The imager poses are checked against various acceptance criteria: for example, for 15°±3° relative to the normal to the substrate (110), checking whether a digital image from the sequence sharp enough (703). For example, by checking Weber contrast, Michelson RMS contrast. If the digital image considered is not accepted (703, "N" i.e. "No"), a next digital image of the sequence is considered (701). If one pose passes the acceptance criteria, the digital image that corresponds to that pose is further processed (703, "Y" i.e. "Yes"). That digital image is then corrected for its perspective distortion and resampled using a predetermined resolution (704). Using the imager pose information and an a priori knowledge of the magnetically induced layer (120) location in the design of the security marking, a mask can be built to only keep the part of the digital image where the first zone of the magnetically induced layer in present (705).

The same processing is repeated with the imager (202) at various viewing angles close to the second viewing angle $\theta_2$ (706 to 710). The second viewing angle $\theta_2$ being the viewing angle associated with the elevation angle $\gamma_2$ of the pigment particles within the second zone (120b) of the magnetically induced layer (120).

The digital image obtained at step (704), after being masked at step (705), and the digital image obtained at step (709), after being masked at step (710), are combined at step (711) to form a resulting composite digital image. The composite digital image obtained at step (711) is then decoded at step (712) with a decoder (including error correction), and the data content of the code pattern (134) is extracted. Combining the two digital images at step (711) can be achieved via known digital image processing algorithms that stitch the two digital images and adjust the contrast and the intensity over the whole machine readable marking. Another possibility is to perform the following operations on two digital images A and B of the security marking (100), respectively taken at a viewing angles close to $\theta_1$ and $\theta_2$ as above, and:

- locating the "partial" code pattern from image A (corresponding to the first part of the code pattern (134)), and a sampling grid is constructed using standard code detection techniques;
- forming a binary representation B1 of the partial code pattern of image A;
- locating the "partial" code pattern from image B (corresponding to the second part of the code pattern (134)), and a sampling grid is constructed using standard code detection techniques;
- forming a binary representation B2 of the partial code pattern of image B;
- combining the obtained binary representations B1 and B2 of the code patterns of images A and B by applying a Truth table to every corresponding module of the binary representations (i.e. a "black" module in B1 and a black module in B2 give a black module of the combined binary representation CB; a "white" module in B1 and a white module in B2 give a white module in CB; a black (resp. white) module in B1 and a white (resp. black) module in B2 give a white module in CB); and
- a standard code error correction algorithm is applied to the obtained combined binary representation CB of the (full) code pattern to recover potential errors that may be present, and obtaining an error-free composite digital image of the code pattern (134).

Figure 8A:
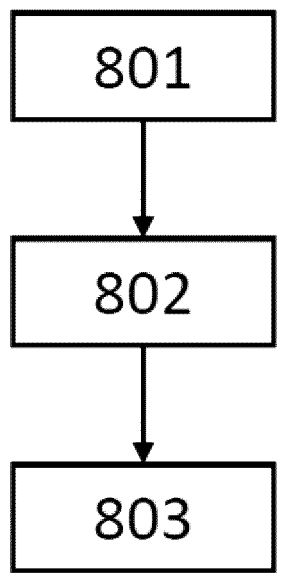
FIG. 8A-B illustrate pose estimation flow charts with two methods (800a) and (800b) for reading and decoding the security marking (100) according to the invention with the imager of the portable device.
Figure 8B:
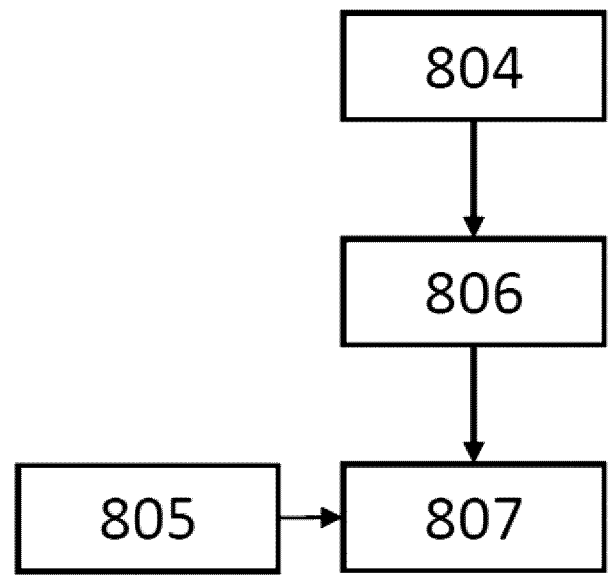

The pose estimation of the imager (202) can be performed using several known methods. Two of them are respectively schematically illustrated of FIG. 8A and FIG. 8B.

One possible method of pose estimation is as follows (see FIG. 8A):

- the machine readable marking (130) being applied on a flat surface, the acquired digital image sequence (801) is sent to a commercially available planar extraction library (802) (such as, for example, Vuforia, ARCore or ARKit). That library returns the estimated pose of the imager relative to the plane of the applied machine readable marking (803).

Another possible method of pose estimation is as follows (see FIG. 8B) (fiducial marks, e.g. CCTags, may be added to the security marking if the reference pattern is not suitable for pose estimation):

- an acquired digital image (804) is processed (via conventional image processing) to extract graphical design information (i.e. positioning of the reference pattern) (805) and detect (806) the reference pattern (133) by using known pattern matching or detector specific to the type of marking (here, QR code), for example, CCTag, ARTag, ARToolKit tag etc. . . . , and provides a pose estimation (807) using the detected positioning of the reference pattern, for example by using the SolvePnP program from the OpenCV library (see, for example, the article from V. Lepetit and al., "An accurate o(n) solution to the pnp problem" International Journal of Computer Vision, 81(2), pp. 155-166, 2009). However, many other pose estimation methods are known to the skilled person.

Other types of machine readable markings can be used for implementing the invention, for example a datamatrix with its reference pattern in a form of a L-shape (see FIG. 5C).

Figure 9:
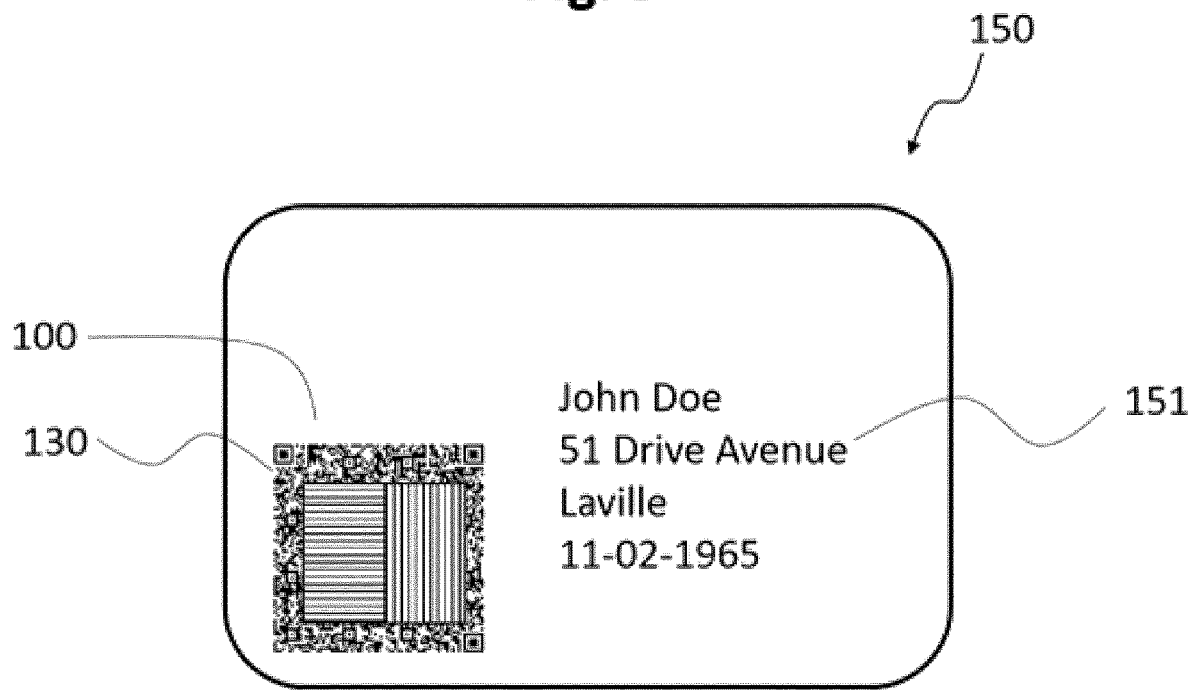
FIG. 9 illustrates an example of a security document (150) according to the invention, i.e. an identity card of a user delivered by an authority.

FIG. 9 shows an example of security document (150) according to the invention, here an identity card of a user John Doe with printed identity data (151) indicating a name of the user, his address and date of birth. This security document has been delivered to the user by an authority and this authority has applied a security marking (100) of the document. The code pattern (134) of the machine readable marking (130) of the security marking (100) contains encoded digital identity data of the user (here, corresponding to the printed identity data) and a digital signature of these digital identity data. The digital signature is delivered by the authority, and obtained with a cryptographic key (stored in a database of the authority, together with a corresponding decryption key). The security marking (100) corresponds to the one shown on FIG. 5C (i.e. a two-dimensional GS1 datamatrix barcode). Depending on the data storage capacity of the machine readable marking, additional identity data can be encoded in the code pattern (130) (for example, biometric data of the user, in some cases a photograph of the user).

Figure 10:
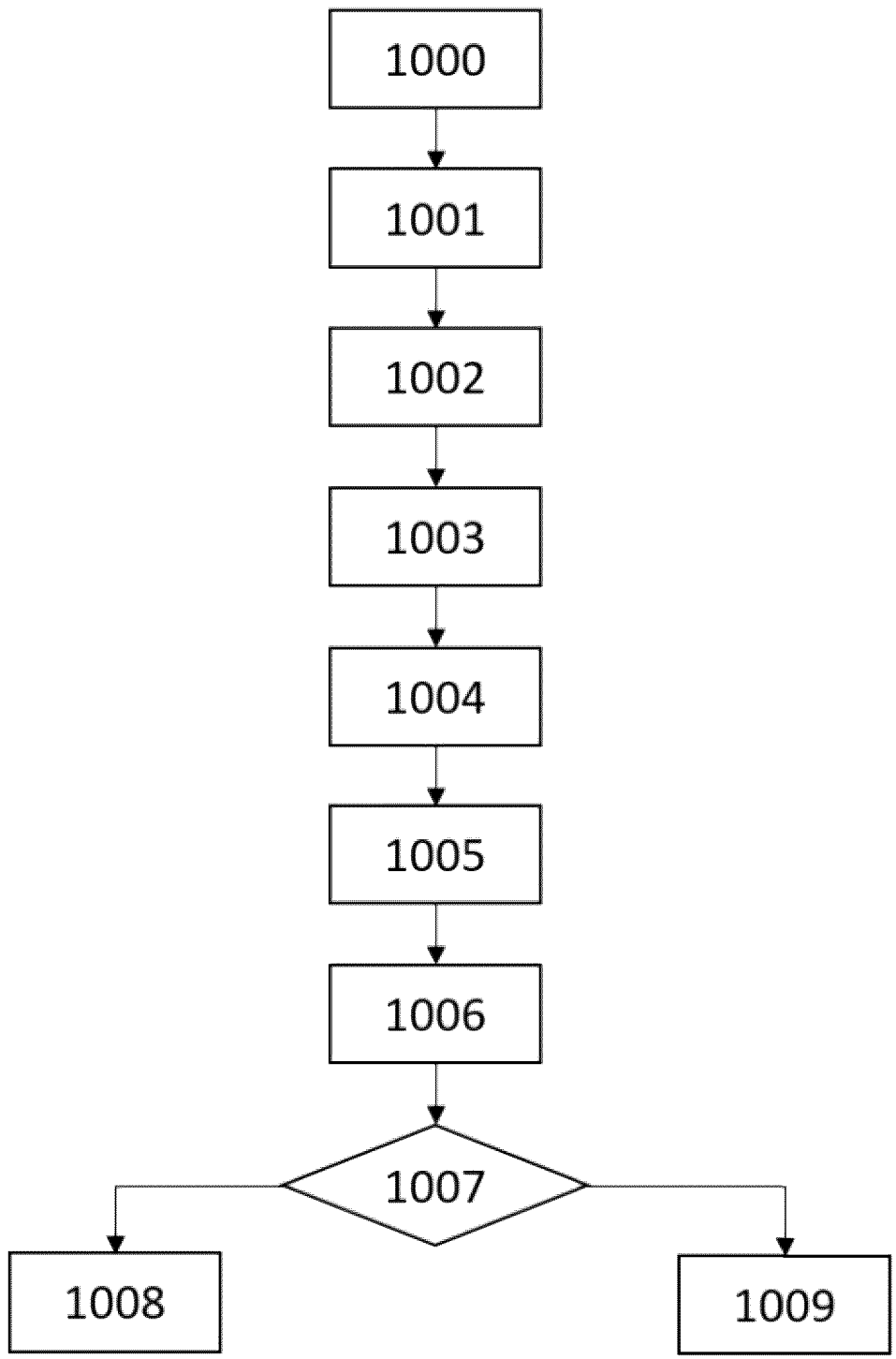
FIG. 10 illustrates a method of verifying the security document of FIG. 9 according to the invention.

FIG. 10 is a flowchart of a method of verifying the security document shown on FIG. 9 by a controller. This method of verifying the security document (150), by the controller having a portable device (200) as shown on FIG. 6, further equipped with a communication unit operable to send and receive data over a communication network (CN) to a server (S) of the authority connected to the database (DB) (see also FIG. 11) wherein the cryptographic key K used for digitally signing the encoded data in the code pattern (134) is stored together with a corresponding decryption key K', comprising the steps of (see also FIG. 6):

- (1000) disposing (by the controller) the security marking (100) on the security document (150) within a field of view of the imager (202) of the portable device (200);
- (1001) illuminating the security marking (100) of the security document (150) with the light source (201) of the portable device (200);
- (1002) acquiring a first digital image of the illuminated magnetically induced layer (120) with the imager (202) at a first viewing angle $\theta_1$ associated with the first elevation angle $\gamma_1$ of the magnetically oriented reflective platelet-shaped magnetic or magnetizable pigment particles within the first zone (120a) of said magnetically induced layer (120), and storing the acquired first digital image in the memory;
- (1003) acquiring a second digital image of the illuminated magnetically induced layer (120) with the imager (202) at a second viewing angle $\theta_2$ associated with the second elevation angle $\gamma_2$ of the magnetically oriented reflective platelet-shaped magnetic or magnetizable pigment particles within the second zone (120b) of said magnetically induced layer (120), and storing the acquired second digital image in the memory;
- (1004) forming, via image processing with the processor, a composite digital image of the code pattern (134)

from the stored first digital image and the stored second digital image by aligning with respect to the reference pattern (133) (here, the L-shape of the datamatrix), detected in the first digital image and the second digital image, a first part of the code pattern (134) which corresponds to the first area (134*a*) of the code pattern (134) detected on the first digital image and a second part of the code pattern (134) which corresponds to the second area (134*b*) of the code pattern (134) detected on the second digital image;

(1005) reading and decoding the code pattern (134) from the obtained composite digital image, and extracting from decoded data of the code pattern a user identity data UID and a digital signature UIDS of said user identity data, via image processing and decoding operations with the processor, and storing the extracted user identity data UID and digital signature UIDS in the memory;

(1006) sending a first message (M1) containing the extracted user identity data UID and digital signature UIDS stored in the memory via the communication unit to the server (S);

(1007) decrypting at the server (S) the extracted digital signature UIDS received in the first message (M1) from the portable device (200) with the decryption key K' stored in the database (DB), and checking that the extracted user identity data UID received in the first message (M1) matches the decrypted extracted digital signature UIDS;

(1008) in case of matching, sending back to the portable device (200) a server message (SM) indicating a successful verification of the user identity data; and (1009) in case the extracted user identity data UID received in the first message (M1) does not match the decrypted extracted digital signature UIDS, sending back to the portable device (200) a server alert message (SALM) indicating that the verification of the user identity data failed.

In case of reception of a server alert message (SALM) by the portable device (200), the controller using this portable device is informed that the security document is not genuine and, for example, may take the necessary measures with respect to the user having produced this counterfeited security document.

Figure 11:
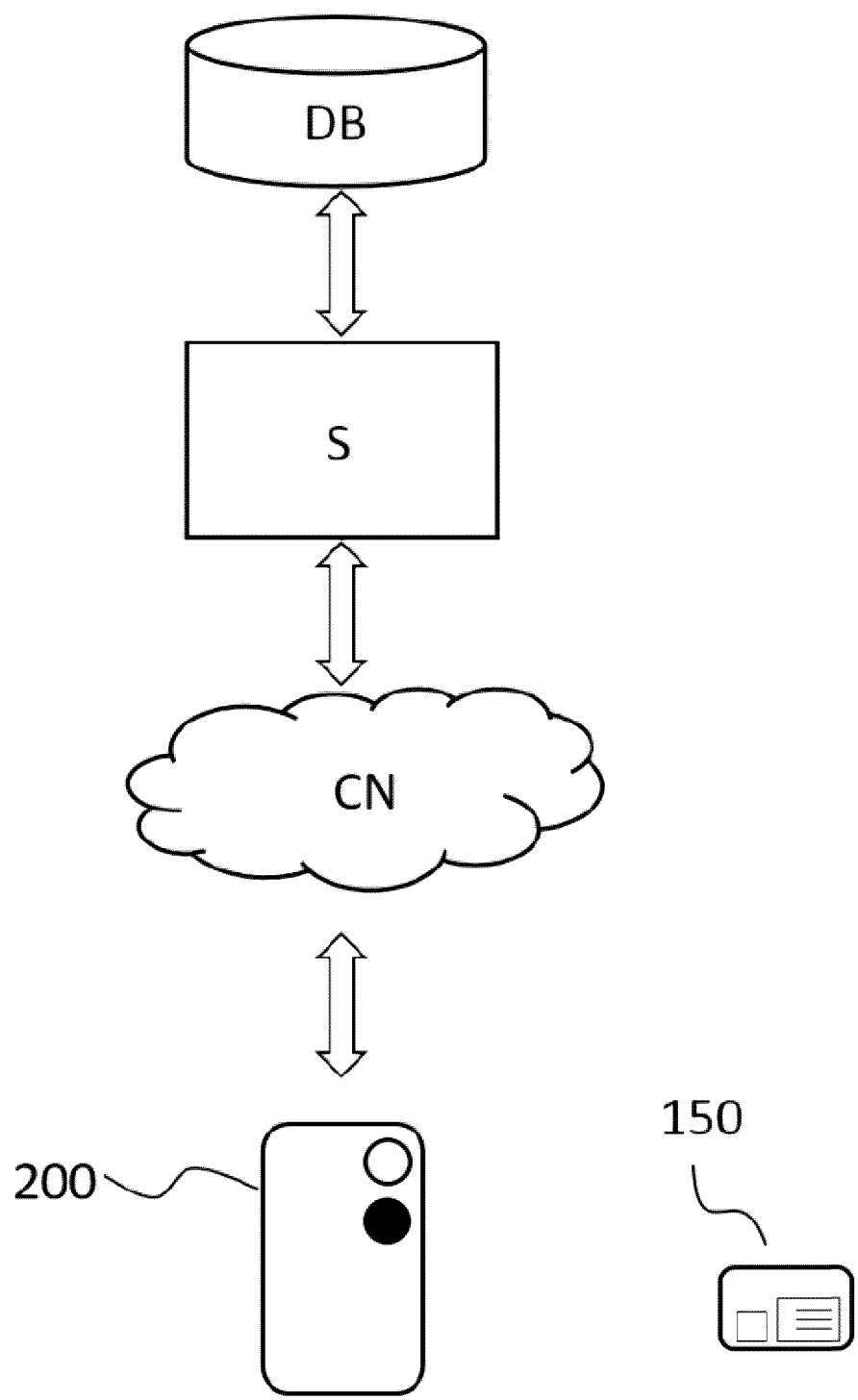
FIG. 11 illustrates a system for verifying a security document according to the method illustrated on FIG. 9.

A system adapted to perform the above mentioned operations for allowing a controller to verify the security document of a user (as shown on FIG. 9) is schematically illustrated on FIG. 11. The view represents the server (S) of the authority having delivered the security document (150) to the user, connected to a database (DB) wherein the cryptographic key K and its corresponding decryption key K' are stored. The portable device (200) of the controller is a smartphone. Here, a screen of the smartphone displays the server message (SM) indicating that the verification of the security document is successful (e.g. the information OK is displayed).

The above method of verifying a security document of a user according to the invention, and the corresponding system for implementing the operations necessary for carrying out said verification, may have some variants involving an in-depth authentication of the security marking. Particularly, when the verification method is used for granting access to a user to some online service (e.g. bank transaction, online registration, online payment etc.).

Figure 6A:
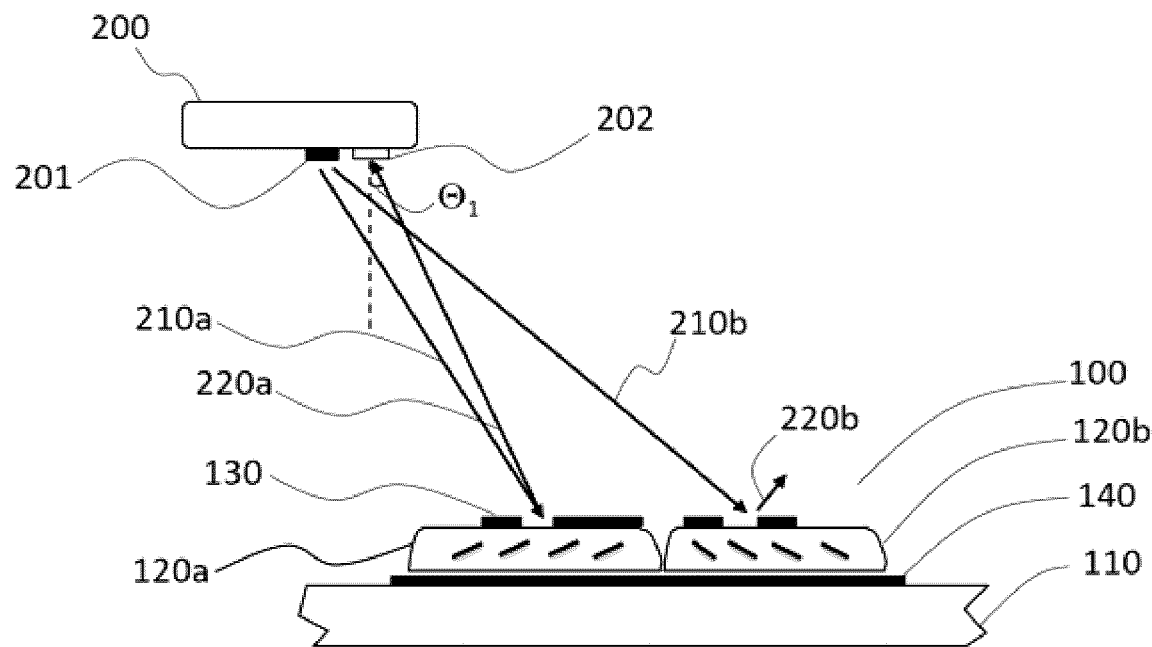
FIG. 6A-B illustrate a portable device (200) taking images of a security marking (100) comprising the magnetically induced layer (120) with the two zones (120a) and (120b) at two distinct viewing angles $\theta_1$ and $\theta_2$, wherein the illumination of the first and second zones (120a) and (120b) is shown as (210a), respectively (210b) and the reflected light from the first and second zones is shown as (220a), respectively (220b).
Figure 6B:
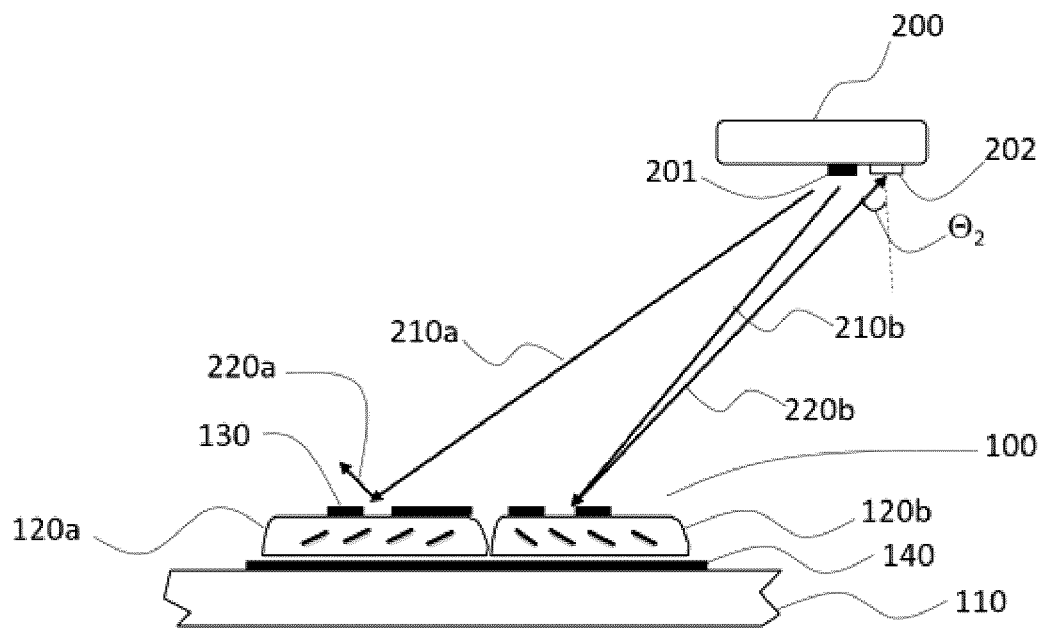

In an embodiment of a first variant of the verification method, we consider a user equipped with his smartphone, suitably programmed (e.g. by having downloaded a suitable application for image processing and decoding operations, to run on the smartphone) to perform also as a portable device (200) according to the invention as shown on FIG. 6. The smartphone being equipped with a communication unit operable to send and receive data over a communication network (CN) to a server (S) of the authority having delivered an identity card to the user, corresponding to the security document (150) shown on FIG. 9. The server (S) is connected to a database (DB) storing the cryptographic key K used for digitally signing the encoded data in the code pattern (134) of the machine readable marking (130) of the security marking (100) applied on the identity card, together with a corresponding decryption key K'. The following steps are carried out:

(1200) disposing (by the user) the security marking (100) on the security document (150) within a field of view of the imager (202) of the smartphone (200);

(1201) illuminating the security marking (100) of the security document (150) with the light source (201) of the smartphone (200), the illumination resulting from a firing of the flash of the smartphone by the user;

(1202) acquiring (by the user) a first digital image of the illuminated magnetically induced layer (120) with the imager (202) at a first viewing angle $\theta_1$ associated with the first elevation angle $\gamma_1$ of the magnetically oriented reflective platelet-shaped magnetic or magnetizable pigment particles within the first zone (120*a*) of said magnetically induced layer (120), and storing the acquired first digital image in the memory of the smartphone;

(1203) acquiring (by the user) a second digital image of the illuminated magnetically induced layer (120) with the imager (202) at a second viewing angle $\theta_2$ associated with the second elevation angle $\gamma_2$ of the magnetically oriented reflective platelet-shaped magnetic or magnetizable pigment particles within the second zone (120*b*) of said magnetically induced layer (120), and storing the acquired second digital image in the memory of the smartphone;

(1204) forming, via image processing with the processor of the smartphone, a composite digital image of the code pattern (134) from the stored first digital image and the stored second digital image by aligning with respect to the reference pattern (133) (the L-shape of the datamatrix), detected in the first digital image and the second digital image, a first part of the code pattern (134) which corresponds to the first area (134*a*) of the code pattern (134) detected on the first digital image and a second part of the code pattern (134) which corresponds to the second area (134*b*) of the code pattern (134) detected on the second digital image;

(1205) reading and decoding the code pattern (134) from the obtained composite digital image, and extracting from decoded data of the code pattern a user identity data UID and a digital signature UIDS of said user identity data, via image processing and decoding operations with the processor of the smartphone, and storing the extracted user identity data UID and digital signature UIDS in the memory of the smartphone;

(1206) sending a first message (M1) containing the extracted user identity data UID and digital signature UIDS stored in the memory via the communication unit of the smartphone (200) to the server (S);

(1207) decrypting at the server (S) the extracted digital signature UIDS received in the first message (M1) from the smartphone (200) with the decryption key K' stored in the database, and checking that the extracted user identity data UID received in the first message (M1) matches the decrypted extracted digital signature UIDS;

(1208) illuminating the magnetically induced layer (120) with the light source (201) and acquiring a plurality of digital images, for example ten images, of the illuminated magnetically induced layer (120) with the imager (202), the imager (202) being for each different digital image at a corresponding distinct viewing angle θ with respect to said magnetically induced layer (120), by moving the imager (202) relatively to the magnetically induced layer (120) parallel to the plane of the substrate (110) (this motion, here a translation, of the imager of the smartphone is performed by the user);

(1209) for each acquired digital image, calculating, with the processor of the smartphone, respectively corresponding average intensity I of light reflected by the magnetically induced layer (120) and collected by the imager (202) at corresponding viewing angle θ, and storing (in the memory of the smartphone) the calculated average intensities of the reflected light and corresponding viewing angles to obtain a corresponding reflected light intensity curve I(θ);

(1210) sending with the communication unit of the smartphone (200) a second message (M2) to the server (S) via the communication network (CN) containing the obtained reflected light intensity curve I(θ);

(1211) comparing at the server (S) the reflected light intensity curve I(θ) received in the second message (M2) with a reference reflected light intensity curve $I_{ref}(θ)$ for said magnetically induced layer (120) stored in the database (DB);

(1212) determining at the server (S) whether the magnetically induced layer (120) is genuine based on a result of the comparison;

(1213) in case the magnetically induced layer (120) is determined as genuine, sending back to the smartphone (200) a server message (SM') indicating a successful verification of the user identity data together with an indication that the security marking (100) is genuine, and sending by the server (S) via the communication network (CN) a server authorization message (SAM) to the smartphone (200) of the user containing access data granting to the user access to an online service (e.g. a password for online registration); and (1214) in case the extracted user identity data UID received in the first message (M1) does not match the decrypted extracted digital signature UIDS, or the magnetically induced layer (120) is determined as forged, sending back to the smartphone (200) a server alert message (SALM) indicating that the verification of the user identity data failed.

In an embodiment of a second variant of the verification method, wherein the reflectivity curves I(θ) and $I_{ref}(θ)$ are compared by the portable device (200), we still consider a user equipped with his smartphone, suitably programmed to perform also as a portable device (200) according to the invention as shown on FIG. 6. The smartphone being equipped with a communication unit operable to send and receive data over a communication network (CN) to a server (S) of the authority having delivered an identity card to the user, corresponding to the security document (150) shown on FIG. 9. The server (S) is connected to a database (DB) storing the cryptographic key K used for digitally signing the encoded data in the code pattern (134) of the machine readable marking (130) of the security marking (100) applied on the identity card, together with a corresponding decryption key K'. The following steps are carried out:

(1300) disposing (by the user) the security marking (100) on the identity card (150) within a field of view of the imager (202) of the smartphone (200);

(1301) illuminating the security marking (100) of the security document (150) with the light source (201) of the smartphone (200), the illumination resulting from a firing of the flash of the smartphone by the user;

(1302) acquiring (by the user taking pictures) a first digital image of the illuminated magnetically induced layer (120) with the imager (202) of the smartphone (200) at a first viewing angle $θ_1$ associated with the first elevation angle $γ_1$ of the magnetically oriented reflective platelet-shaped magnetic or magnetizable pigment particles within the first zone (120a) of said magnetically induced layer (120), and storing the acquired first digital image in the memory of the smartphone;

(1303) acquiring (by the user) a second digital image of the illuminated magnetically induced layer (120) with the imager (202) at a second viewing angle $θ_2$ associated with the second elevation angle $γ_2$ of the magnetically oriented reflective platelet-shaped magnetic or magnetizable pigment particles within the second zone (120b) of said magnetically induced layer (120), and storing the acquired second digital image in the memory of the smartphone (200);

(1304) forming, via image processing with the processor of the smartphone, a composite digital image of the code pattern (134) from the stored first digital image and the stored second digital image by aligning with respect to the reference pattern (133) (the L-shape of the datamatrix), detected in the first digital image and the second digital image, a first part of the code pattern (134) which corresponds to the first area (134a) of the code pattern (134) detected on the first digital image and a second part of the code pattern (134) which corresponds to the second area (134b) of the code pattern (134) detected on the second digital image;

(1305) reading and decoding the code pattern (134) from the obtained composite digital image, and extracting from decoded data of the code pattern a user identity data UID and a digital signature UIDS of said user identity data, via image processing and decoding operations with the processor of the smartphone (200), and storing the extracted user identity data UID and digital signature UIDS in the memory of the smartphone;

(1306) sending a first message (M1) containing the extracted user identity data UID and digital signature UIDS stored in the memory via the communication unit of the smartphone (200) to the server (S);

(1307) decrypting at the server (S) the extracted digital signature UIDS received in the first message (M1) from the smartphone (200) with the decryption key K' stored in the database (DB), and checking that the extracted user identity data UID received in the first message (M1) matches the decrypted extracted digital signature UIDS;

(1308) in case of matching, sending back to the smartphone (200) a server message (SM) indicating a successful verification of the user identity data;

(1309) in case of delivering by the server (S) of a server message (SM) indicating a successful verification of the user identity data, illuminating (by the user) the magnetically induced layer (120) of the machine readable marking (130) on the identity card (150) with the light source (201) and acquiring a plurality of digital images of the illuminated magnetically induced layer (120) with the imager (202) of the smartphone (200), the imager (202) being for each different digital image at a corresponding distinct viewing angle θ with respect to said magnetically induced layer (120), by moving the imager (202) relatively to the magnetically induced layer (120) parallel to the plane of the substrate (here, the user perform a translation of the imager parallel to the security marking);

(1310) for each acquired digital image, calculating, with the processor, respectively corresponding average intensity I of light reflected by the magnetically induced layer (120) and collected by the imager (202) at corresponding viewing angle θ, and determining with the calculated average intensities of the reflected light and corresponding viewing angles a corresponding reflected light intensity curve I(θ);

(1311) comparing via the processor of the smartphone (200) the reflected light intensity curve I(θ) with a reference reflected light intensity curve $I_{ref}(\theta)$ for said magnetically induced layer (120) stored in the memory of the smartphone;

(1312) determining via the processor of the smartphone (200) whether the magnetically induced layer (120) is genuine based on a result of the comparison, and, in case the magnetically induced layer (120) is determined as genuine, sending to the server (S), with the communication unit of the smartphone via the communication network (CN), a message (M) indicating that the security marking (100) is genuine; and (1313) in case of reception at the server (S) of a message (M) from the smartphone (200) indicating that the security marking (100) is genuine, sending back by the server (S) via the communication network (CN) a server authorization message (SAM) to the smartphone (200) of the user containing access data granting to the user access to an online service.

Examples of Security Markings

The Examples E1-E4 have been carried out by using the UV-Vis curable screen printing ink of the formula given in Table 1 and the first and second magnetic assemblies described herebelow.

TABLE 1

| Ingredients | Wt-% |
| --- | --- |
| Epoxyacrylate oligomer (Allnex) | 30.1 |
| Trimethylolpropane triacrylate monomer (Allnex) | 21.0 |
| Tripropyleneglycol diacrylate monomer (Allnex) | 21.5 |
| Genorad 16 (Rahn) | 1.1 |
| Aerosil 200 (Evonik) | 1.1 |
| Speedcure TPO-L (Lambson) | 2.2 |
| Irgacure ® 500 (IGM) | 6.4 |
| Genocure ® EPD (Rahn) | 2.2 |
| BYK ® 371 (BYK) | 2.2 |
| Tego Foamex N (Evonik) | 2.2 |
| magnetic pigment particles (*) | 10.0 |

(*) 5-layer platelet-shaped magnetic pigment particles exhibiting a metallic silver color having a flake shape of diameter $d_{50}$ about 19 μm and thickness about 1 μm, obtained from VIAVI Solutions, Santa Rosa, CA.

Figure 12A:
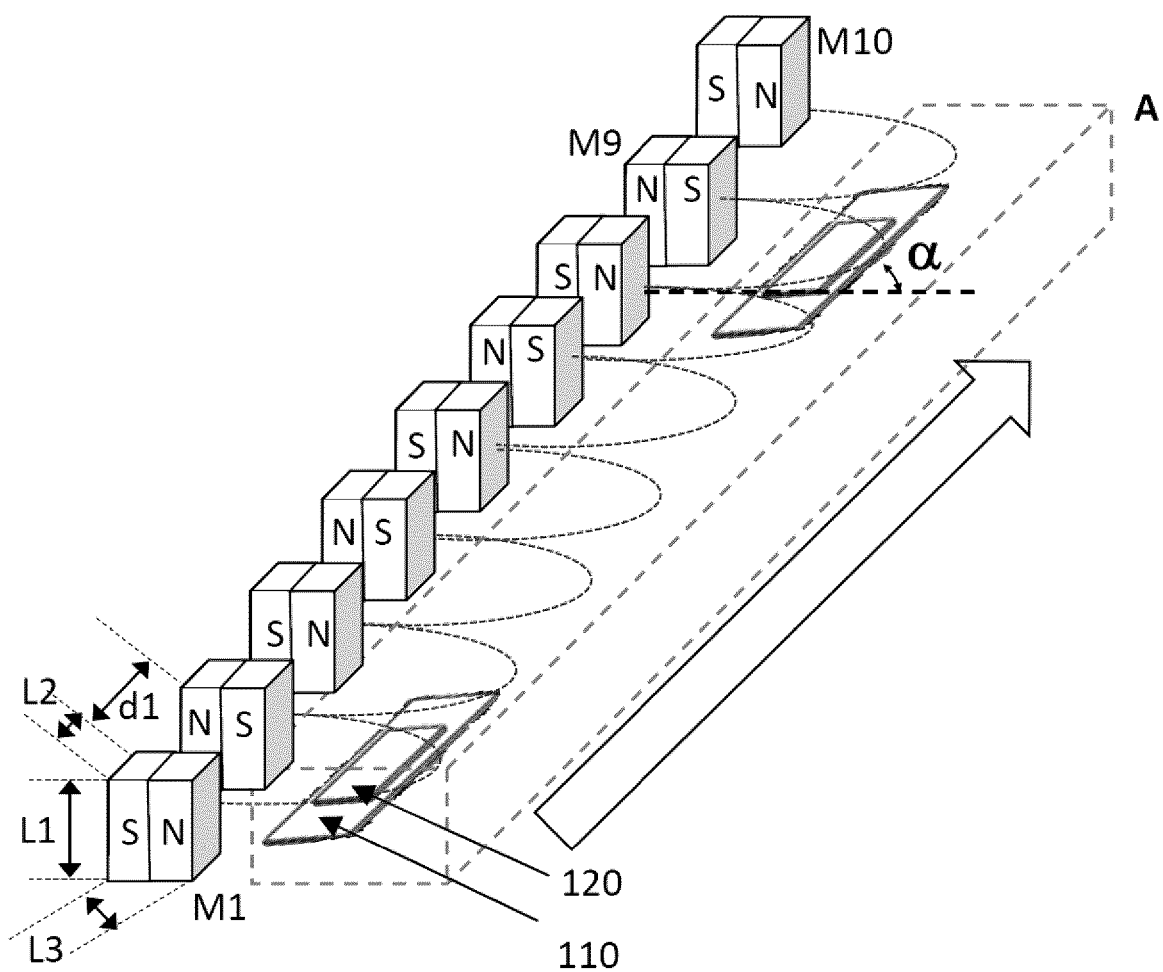
FIG. 12A-B illustrate a process for producing a magnetically induced layer (120) on a substrate (110), wherein said layer (120) comprises reflective platelet-shaped magnetic or magnetizable pigment particles bi-axially oriented.
Figure 12B:
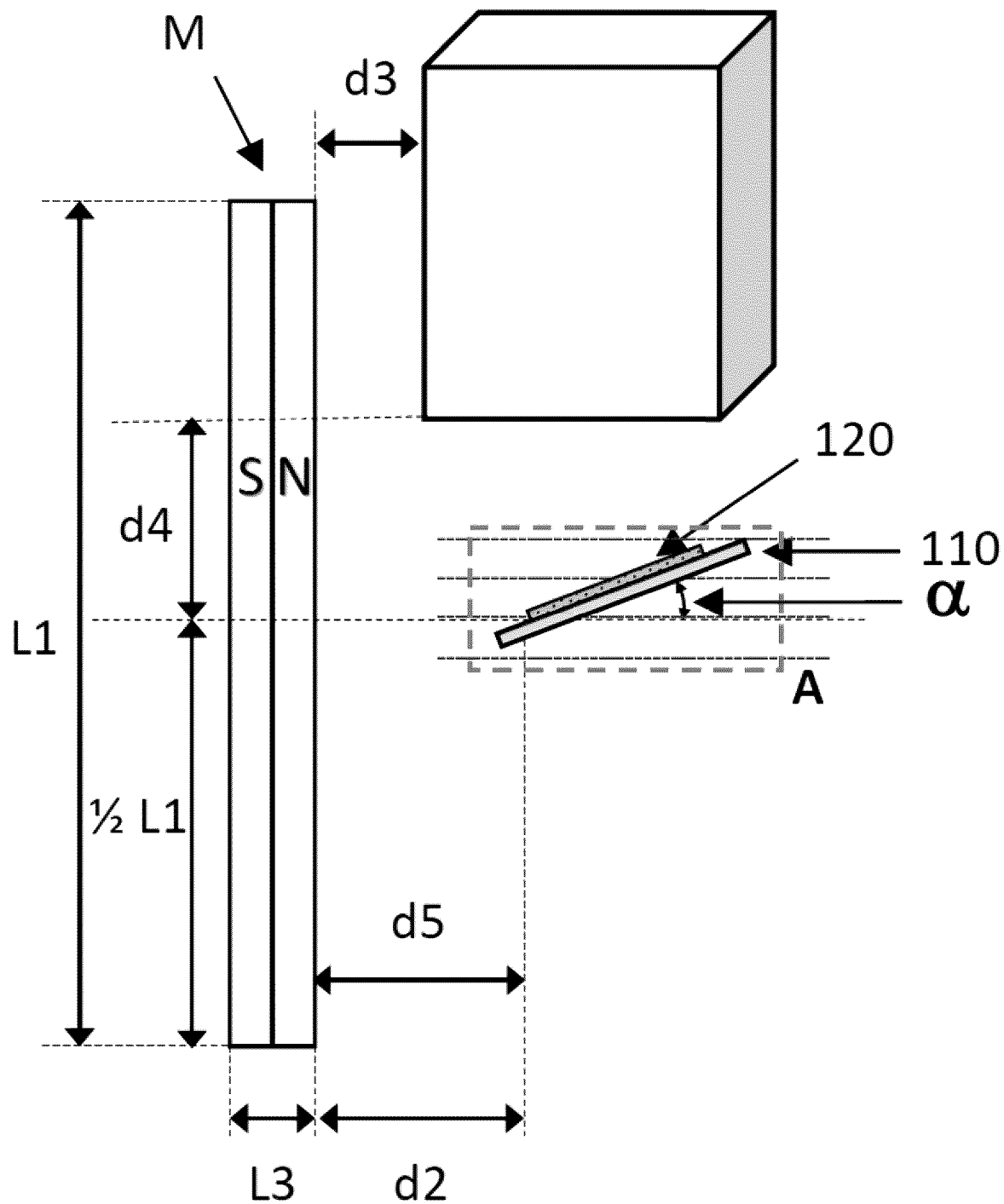

Magnetic-Field Generating Device for Bi-Axial Orientation (FIG. 12A-B)

A magnetic assembly was used to bi-axially orient the pigment particles. The magnetic assembly comprised nine bar dipole magnets (M1-M9).

Each of the nine bar dipole magnets (M1-M9) had the following dimensions: 100 mm (L1)×10 mm (L2)×10 mm (L3). The magnetic field generating device was embedded in a non-magnetic holder made of polyoxymethylene (POM) (not shown) having the following dimensions: 250 mm×150 mm×12 mm. The nine bar dipole magnets (M1-M9) were made of NdFeB N40.

The nine bar dipole magnets (M1-M9) were disposed in a row at a distance (d1) of about 10 mm from each other, the top surface of the nine bar dipole magnets (M1-M9) being flush. The magnetic axis of each of the nine bar dipole magnets (M1-M9) was substantially parallel to the thickness (L3) of said magnets, the magnetic direction of two neighboring magnets (M1-M9) pointing in opposite direction (alternating magnetization). The magnetic field was substantially homogeneous and the magnetic field lines were substantially coplanar in the area A.

Figure 13:
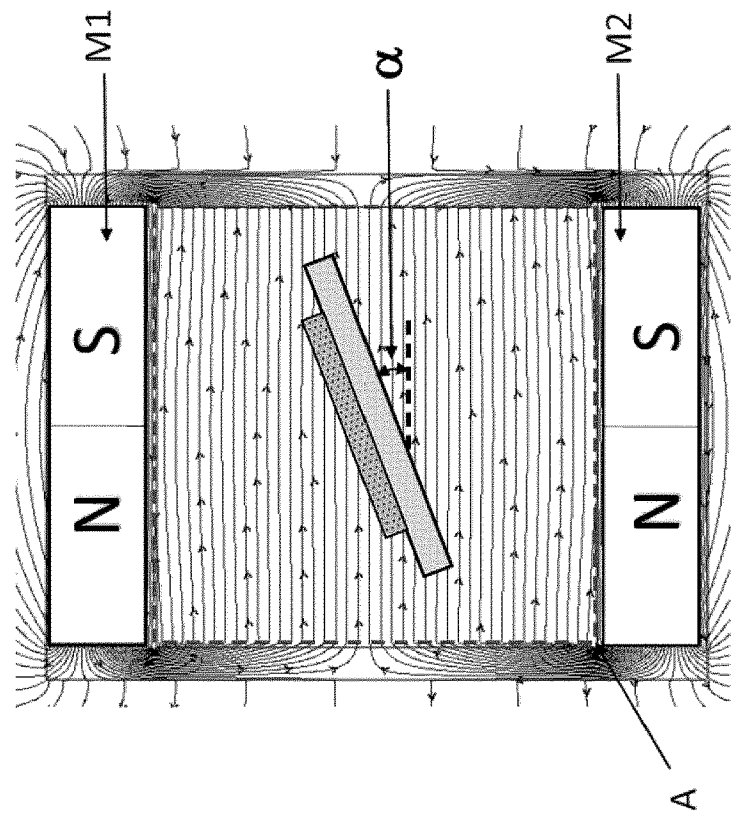
FIG. 13 illustrates a process for producing a magnetically induced layer (120) on a substrate (110), wherein said layer (120) comprises reflective platelet-shaped magnetic or magnetizable pigment particles mono-axially oriented.
Figure 13:
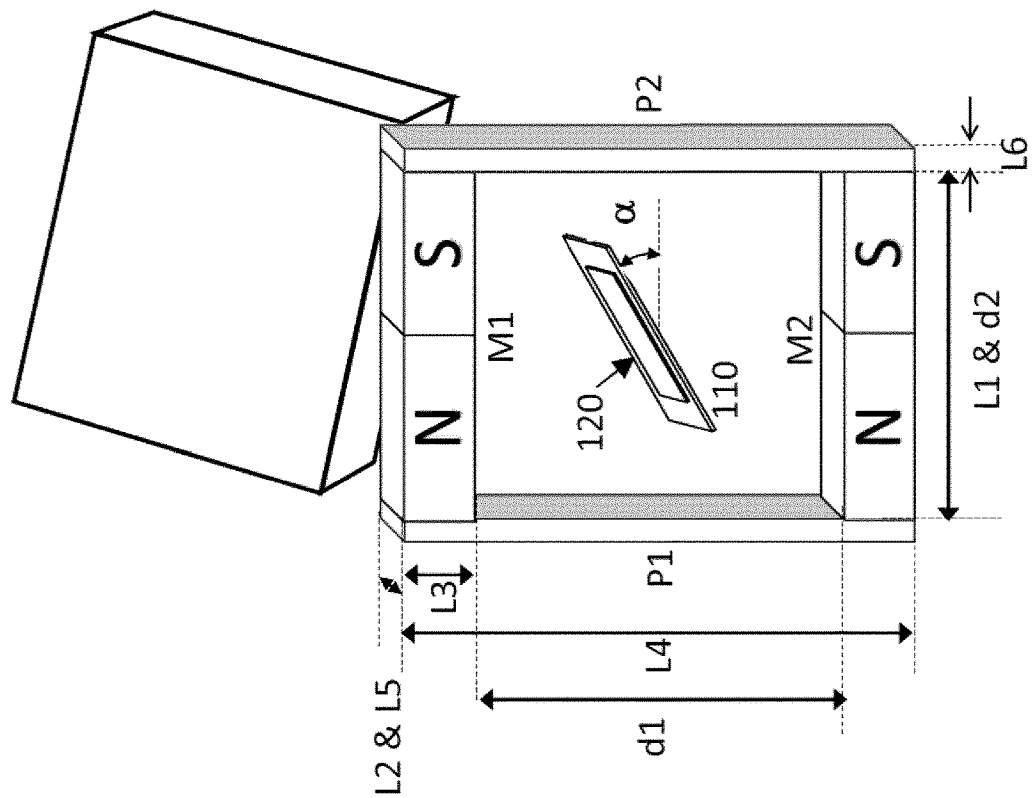

Magnetic-Field-Generating for Mono-Axial Orientation (FIG. 13)

A magnetic field generating device was used to mono-axially orient the pigment particles. The magnetic field generating device comprised two bar dipole magnets (M1, M2) and two pole pieces (P1, P2).

Each of the two bar dipole magnets (M1, M2) had the following dimensions: 40 mm (L1)×40 mm (L2)×10 mm (L3). The two bar dipole magnets (M1, M2) were made of NdFeB N42.

The two bar dipole magnets (M1, M2) were at a distance (d1) of about 40 mm from each other. The magnetic axis of each of the two bar dipole magnets (M1, M2) was substantially parallel to the length (L1) of said magnets, the magnetic direction of said two bar dipole magnets (M1, M2) pointing in the same direction. Each of the two pole pieces (P1, P2) had the following dimensions: 60 mm (L4)×40 mm (L5)×3 mm (L6). The two pole pieces (P1, P2) were made of iron (ARMCO®).

The two bar dipole magnets (M1, M2) and the two pole pieces (P1, P2) were disposed such as to form a rectangular cuboid with a centered rectangular cuboid void, said void consisting of the area A wherein the magnetic field was substantially homogeneous and wherein the magnetic field lines were substantially parallel to each other, such that the distance (d2) between the two pole pieces (P1, P2) was about 40 mm, i.e. the distance (d2) between the two pole pieces (P1, P2) was the length (L1) of the two bar dipole magnets (M1, M2). As shown in FIG. 13, the magnetic field was substantially homogeneous in the area A.

E1 (FIG. 2, FIG. 12A-B, FIG. 14A)

The UV-Vis curable screen printing ink of Table 1 was applied onto on a piece of black coated paper (45 mm×60 mm) (110) so as to form a first coating layer (30 mm×19 mm) (120a), wherein said application step was carried out with a laboratory screen printing device using a 90T screen so as to form the layer having a thickness of about 20 μm.

While the coating layer (120a) was still in a wet and not yet at least partially cured state, the substrate (110) was placed on top of the center of a supporting plate (300 mm×40 mm×1 mm) made of high density polyethylene (HDPE). The supporting plate carrying the substrate (110) was moved at a speed of about 10 cm/sec beside the magnetic-field generating device (as illustrated in FIG. 12A) at a distance (d5) of about 20 mm between the magnetic-field-generating device surface facing the substrate (110) and the nearest edge of the first coating layer (120a), and a height between said nearest first coating layer (120a) edge and the bottom surface of the magnetic magnetic-field generating device being half the length (½ L1) of the bar dipole magnets (M1-M9). The supporting plate carrying the substrate (110) was concomitantly moved while adopting an angle α, formed by the first coating layer (120a) and a tangent to magnetic field lines of the magnetic field of magnetic-field-generating device within the area A wherein the magnetic field was homogeneous, said angle α having a value of about 20° thus allowing the particles to orient with an elevation angle of about 20° thus allowing the particles to orient with an elevation $\gamma_1$ angle of about 20.

The first coating layer (120a) was at least partially cured so as to form the first zone (120a), said curing being carried out by a curing unit (UV LED lamp (FireFly 395 nm, 4 W/cm$^2$, from Phoseon) disposed above the substrate path at a distance (d4) of about 15 mm for the center of the length (L1) of the bar dipole magnet (M1-M9), beside the space between the eighth and ninth dipole magnets (M8 and M9) and beside the ninth bar dipole magnet (M9) at a distance (d3) of about 10 mm.

The UV-Vis curable screen printing ink of Table 1 was applied onto the piece of black coated paper (110) so as to form a second coating layer (30 mm×19 mm) (120b), adjacent (along the 19 mm edge) to the first zone (120a), using the same laboratory 90T screen printing device. The resulting combined coating layers (120a and 120b) had a total surface of 30 mm×38 mm.

While the second coating layer (120b) was still in a wet and not yet at least partially cured state, the substrate (110) was placed on top of the center of the supporting plate (300 mm×40 mm×1 mm) made of high density polyethylene (HDPE). The supporting plate carrying the substrate (110) was moved at a speed of about 10 cm/sec beside the same magnetic-field generating device (as illustrated in FIG. 12A-B) at the same distance (d5) of about 20 mm between the magnetic-field-generating device surface facing the substrate (110) and the nearest edge of the second coating layer (120b), and a height between said nearest second coating layer (120b) edge and the bottom surface of the magnetic magnetic-field generating device being half the length (½ L1) of the bar dipole magnets (M1-M9). The supporting plate carrying the substrate (110) was concomitantly moved while adopting an angle α, formed by the coating layer (120b) and a tangent to magnetic field lines of the magnetic field of magnetic-field-generating device within the area A wherein the magnetic field was homogeneous, said angle α having a value of about 160° thus allowing the particles to orient with an elevation angle of about 160° thus allowing the particles to orient with an elevation $\gamma_2$ angle of about 160°.

The second coating layer (120b) was at least partially cured so as to form the second zone (120b), said curing being carried out by the curing unit (UV LED lamp (FireFly 395 nm, 4 W/cm$^2$, from Phoseon) disposed above the substrate path at a distance (d4) of about 15 mm for the center of the length (L1) of the bar dipole magnet (M1-M9), beside the space between the eighth and ninth dipole magnets (M8 and M9) and beside the ninth bar dipole magnet (M9) at a distance (d3) of about 10 mm so as to form the second zone (120b), thus providing the magnetically induced image (120).

A QR-code (25 mm×25 mm) was printed by inkjet printing on the magnetically induced image (120), so that the QR-code was located in the center of said layer (120), with a black ink (Sicurajet SUV Black from Siegwerk) using a Konica Minolta printing head (KM1024i). The inkjet printed QR-code was at least partially cured using a mercury lamp (500 mJ/cm$^2$).

Figure 14A:
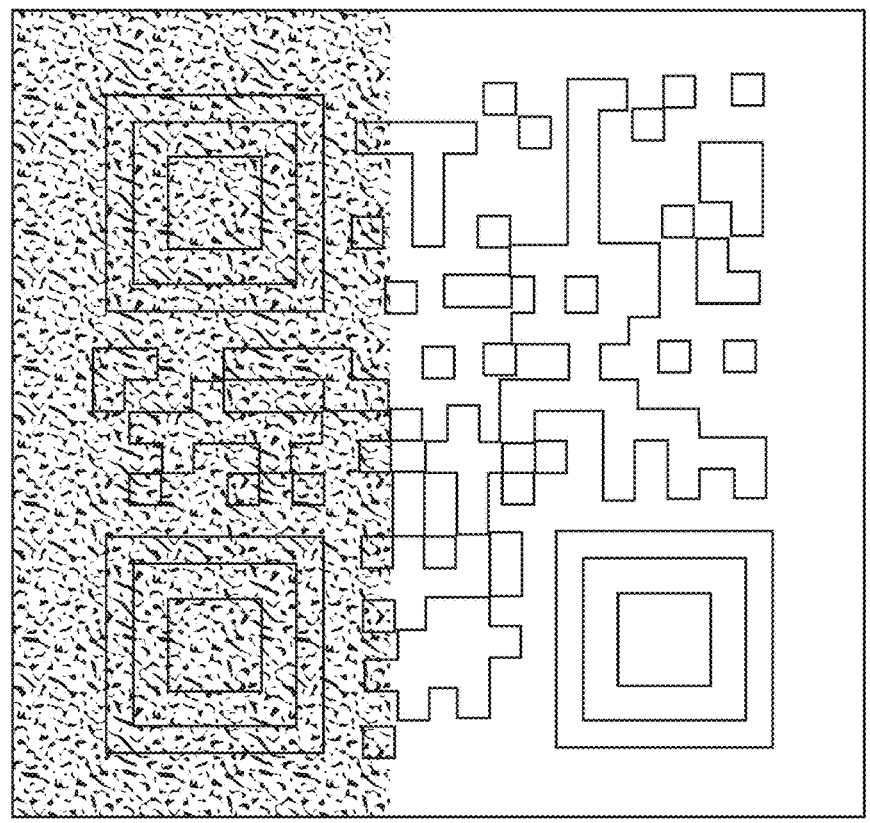
FIG. 14A-D show images of security marking (100) wherein the magnetically induced layers (120) are obtained by using the method and device shown in FIG. 12-13.
Figure 14A:
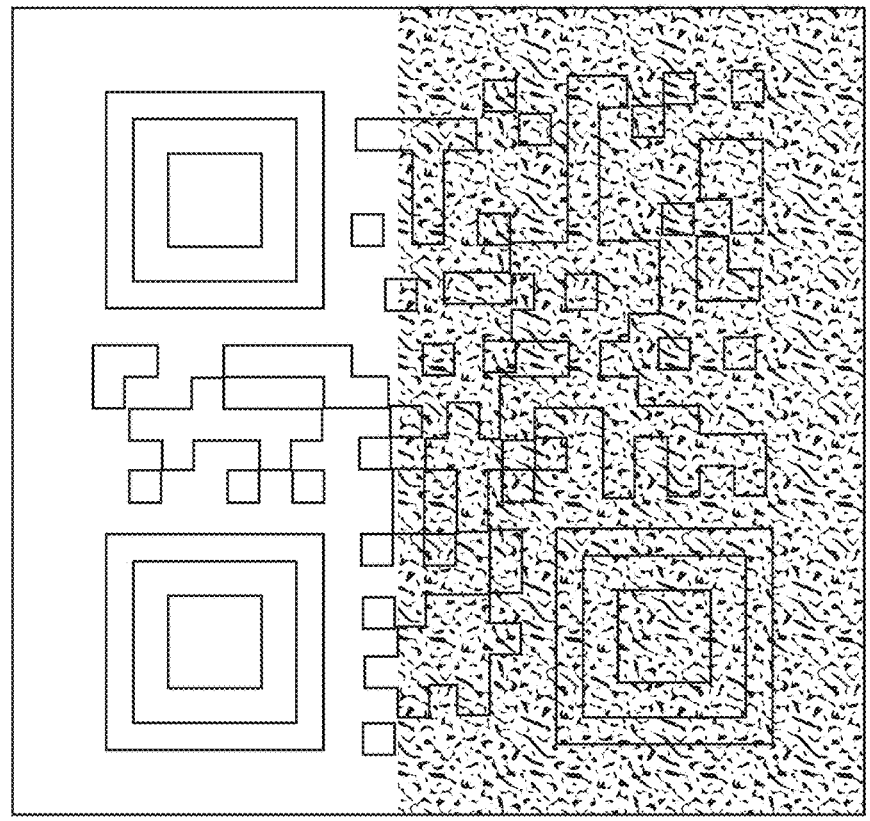

The resulting sample of Example E1 is shown in FIG. 14A (left: viewing angle $\theta_1$ of +22°; right: viewing angle $\theta_2$ of −22°).

E2 (FIG. 2C, FIG. 13, FIG. 14B)

The UV-Vis curable screen printing ink of Table 1 was applied onto on a piece of black coated paper (45 mm×60 mm) (110) so as to form a first coating layer (30 mm×19 mm) (120a), wherein said application step was carried out with a laboratory screen printing device using a 90T screen so as to form the layer having a thickness of about 20 µm.

While the first coating layer (120a) was still in a wet and not yet at least partially cured state, the substrate (110) was placed on top of the center of a supporting plate (300 mm×40 mm×1 mm) made of high density polyethylene (HDPE). The supporting plate carrying the substrate (110) was disposed in the center of the void of the magnetic assembly as illustrated in FIG. 13 while adopting angle α, formed by the first coating layer (120a) and a tangent to magnetic field lines of the magnetic field of magnetic-field-generating device within the area A wherein the magnetic field was homogeneous, having a value of about 8° thus allowing the particles to orient with an elevation $\gamma_1$ angle of about 8°.

After about 1 second, the first coating layer (120a) was at least partially cured so as to form the first zone (120a), said curing being carried out by a curing unit (UV LED lamp (FireFly 395 nm, 4 W/cm$^2$, from Phoseon) as illustrated in FIG. 13.

The UV-Vis curable screen printing ink of Table 1 was applied onto the piece of black coated paper (110) so as to form a second coating layer (30 mm×19 mm) (120b), adjacent (along the 19 mm edge) to the first zone (120a), using the same laboratory 90T screen printing device. The resulting combined coating layers (120a and 120b) had a total surface of 30 mm×38 mm.

While the second coating layer (120b) was still in a wet and not yet at least partially cured state, the substrate (110) was placed on top of the center of a supporting plate (300 mm×40 mm×1 mm) made of high density polyethylene (HDPE). The supporting plate carrying the substrate (110) and the second coating layer (120b) were disposed in the center of the void of the magnetic assembly as illustrated in FIG. 13 while adopting angle α, formed by the second coating layer (120b) and a tangent to magnetic field lines of the magnetic field of magnetic-field-generating device within the area A wherein the magnetic field was homogeneous, having a value of about 172° thus allowing the particles to orient with an elevation $\gamma_2$ angle of about 172°.

After about 1 second, the second coating layer (120b) was at least partially cured so as to form the second zone (120b), said curing being carried out by a curing unit (UV LED lamp (FireFly 395 nm, 4 W/cm$^2$, from Phoseon) so as to form the second zone (120b), thus providing the magnetically induced layer (120).

A QR-code (25 mm×25 mm) was printed by inkjet printing on the magnetically induced layer (120), so that the QR-code was located in the center of said layer (120) with a black ink (Sicurajet SUV Black from Siegwerk) using a Konica Minolta printing head (KM1024i). The inkjet printed QR-code was at least partially cured using a mercury lamp (500 mJ/cm$^2$).

Figure 14B:
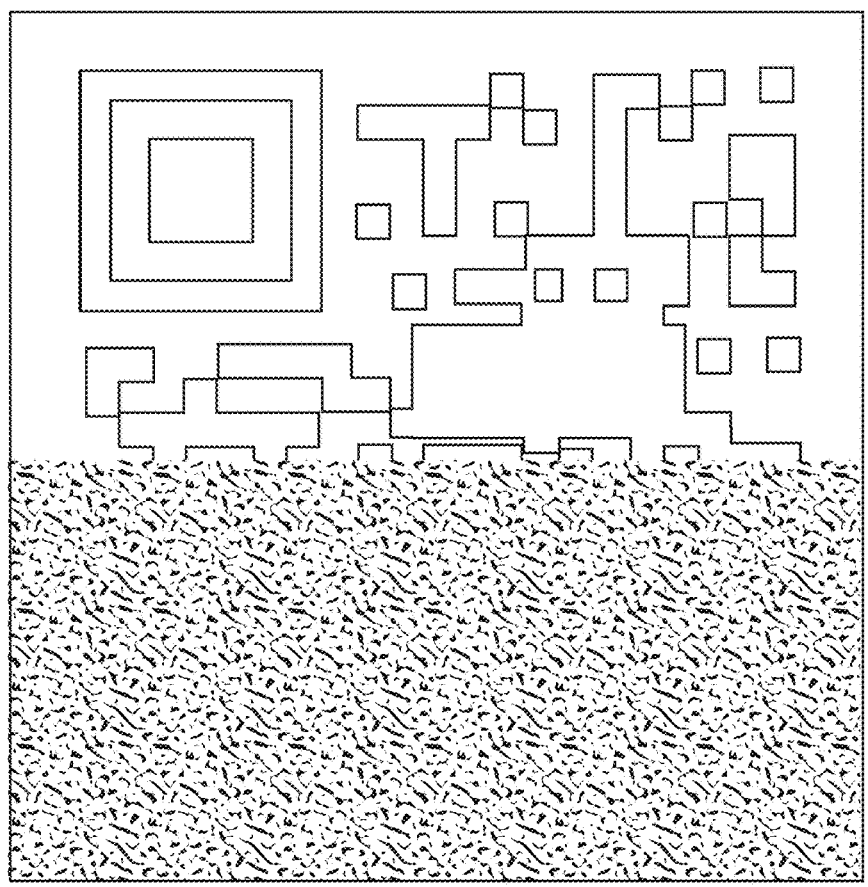
Figure 14B:
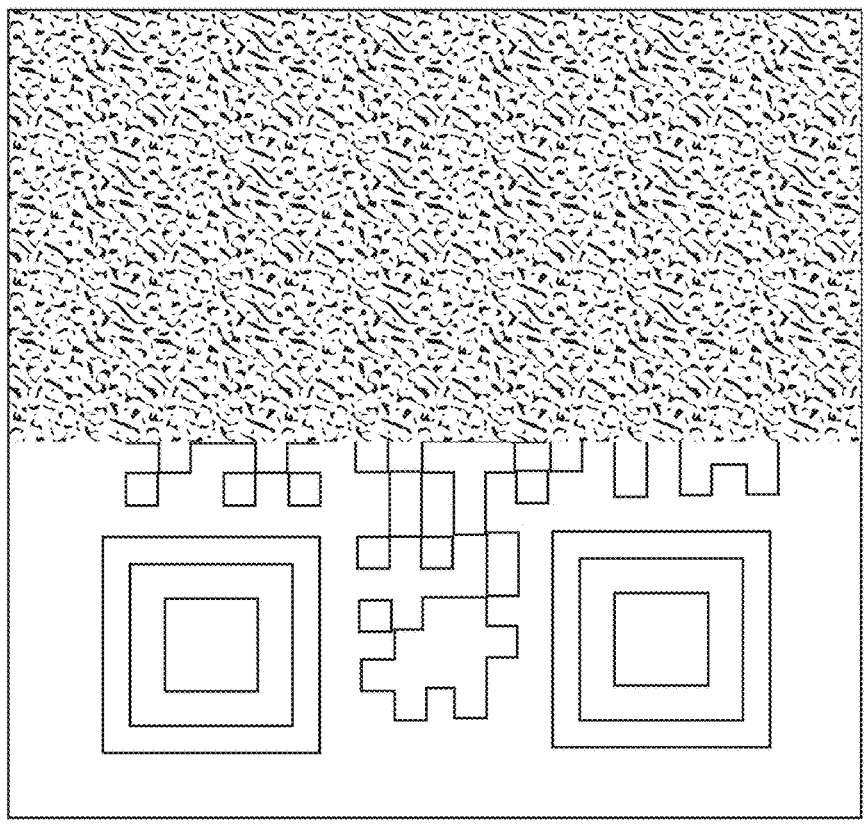

The resulting sample of Example E2 is shown in FIG. 14B (left: viewing angle $\theta_1$ of +10°; right: viewing angle $\theta_2$ of −10°).

E3 and E4 (FIG. 2C, FIG. 12A-B, FIG. 13, FIG. 14C-D

A 10 mm×10 mm piece of the substrate (110) obtained in Example E1 or in Example E2 solely carrying the magnetically induced layer (120) (10 mm×5 mm) was applied and glued each onto on a piece of white coated paper (50 mm×50 mm).

Figure 14C:
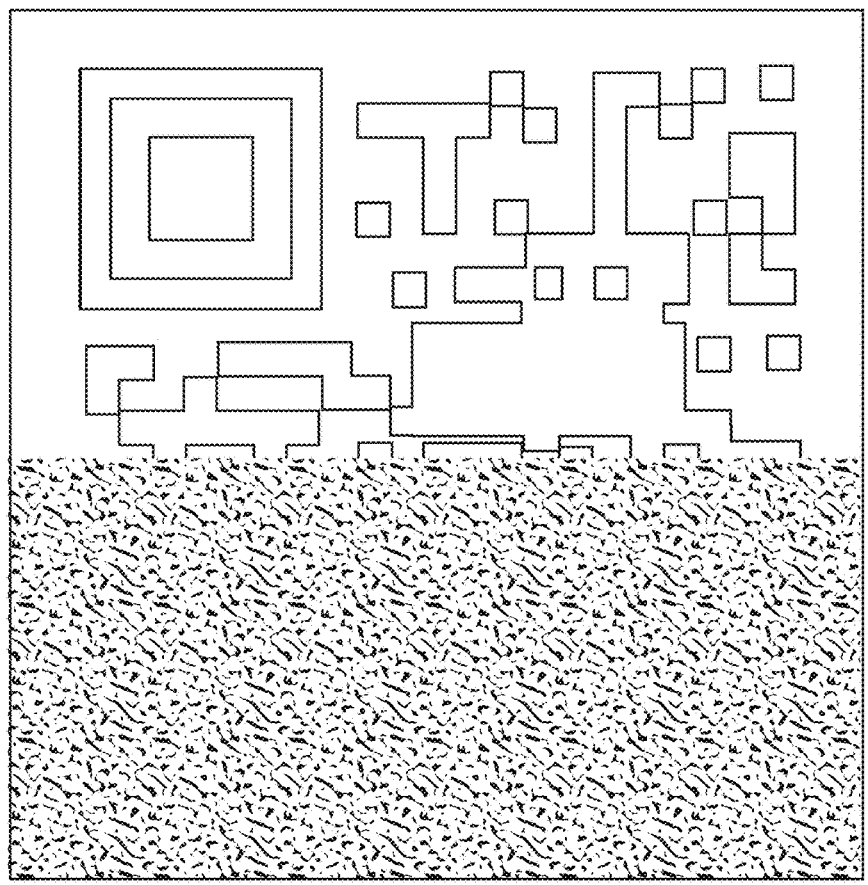
Figure 14C:
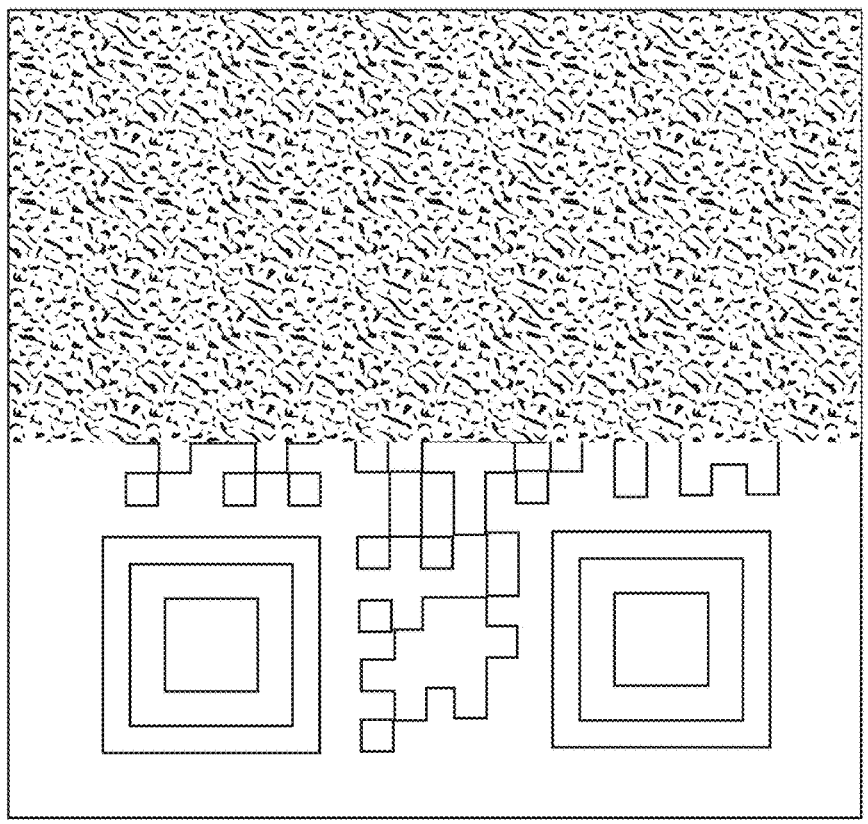
Figure 14D:
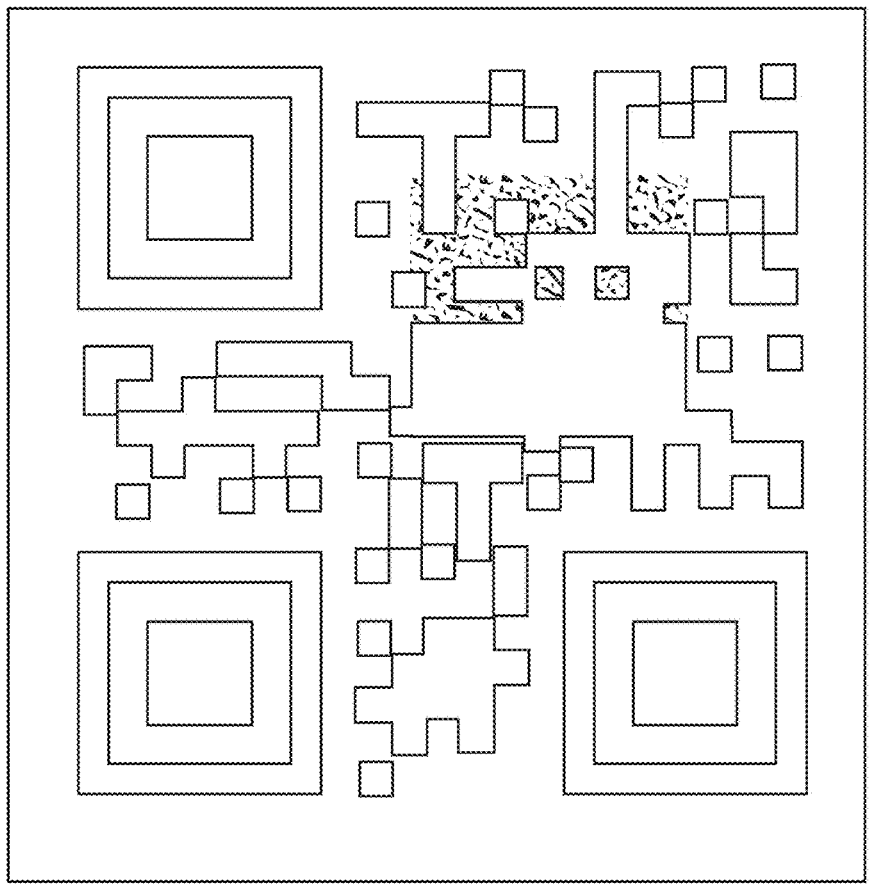
Figure 14D:
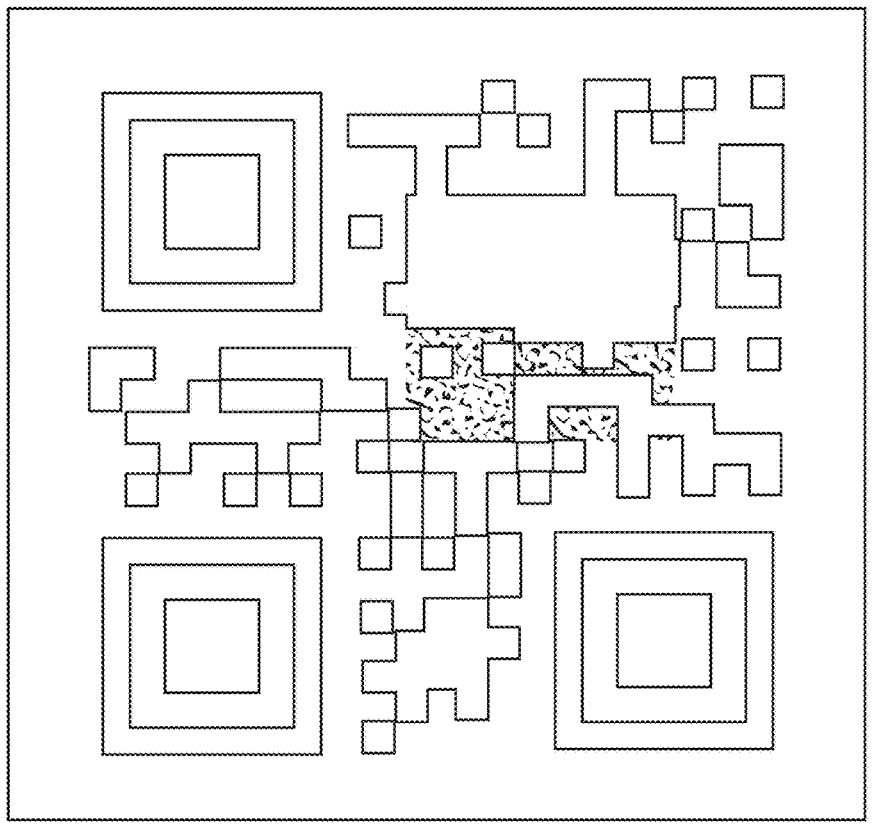

A QR-code (25 mm×25 mm) was printed by inkjet printing on the magnetically induced layer (120), so that the quiet zone of the QR-code was located on top of the said layer (120) with a black ink (Sicurajet SUV Black from Siegwerk) using a Konica Minolta printing head (KM1024i), as illustrated in FIGS. 14C and 14D. The inkjet printed QR-code was at least partially cured using a mercury lamp (500 mJ/cm²).

The resulting sample of Example E3 is shown in FIG. 14C (left: viewing angle $\theta_1$ of +22°; right: viewing angle $\theta_2$ of −22°). The resulting sample E4 is shown 14D (left: viewing angle $\theta_1$ of +10°; right: viewing angle $\theta_2$ of −10°).

The above disclosed subject matter is to be considered illustrative, and not restrictive, and serves to provide a better understanding of the invention defined by the independent claims.

The invention claimed is:

1. A security marking comprising:
a flat substrate;
a magnetically induced layer of a material comprising magnetically oriented reflective platelet-shaped magnetic or magnetizable pigment particles, the magnetically induced layer being applied on the substrate and comprising a first zone wherein said magnetically oriented reflective platelet-shaped magnetic or magnetizable pigment particles have their planar faces oriented in a first direction and a second zone, distinct from the first zone, wherein said magnetically oriented reflective platelet-shaped magnetic or magnetizable pigment particles have their planar faces oriented in a second direction distinct from the first direction, the platelet-shaped particles in the first zone having planar faces with an elevation angle $\gamma_1$ with respect to a plane of the substrate and the platelet-shaped particles in the second zone having planar faces with an elevation angle $\gamma_2$ with respect to the plane of the substrate, each acute angle of the planar faces with respect to the plane of the substrate being in a range from about 5° to about 25°;
a machine readable marking including a reference pattern and a code pattern representing encoded data, the machine readable marking being respectively applied either on a top face of the magnetically induced layer or on the substrate between said substrate and a rear face of the magnetically induced layer, a first area of the code pattern being disposed in front of the first zone and a remaining second area of the code pattern being disposed in front of the second zone.

2. The security marking according to claim 1, wherein
a) said pigment particles comprise:
a magnetic metal selected from the group consisting of cobalt, iron, gadolinium and nickel;
a magnetic alloy of iron, chromium, manganese, cobalt, nickel or a mixture of two or more thereof;
a magnetic oxide of chromium, manganese, cobalt, iron, nickel or a mixture of two or more thereof; or
a mixture of two or more thereof; or
b) the code pattern is any one of a one-dimensional barcode, a stacked one-dimensional barcode, a two-dimensional bar code, and a three-dimensional barcode.

3. The security marking according to claim 1, wherein the first zone and the second zone of the magnetically induced layer belong to a same single layer of material.

4. The security marking according to claim 1, wherein the first zone and the second zone of the magnetically induced layer respectively belong to a first sub-layer and an adjacent second sub-layer forming the magnetically induced layer.

5. The security marking according to claim 1, wherein the machine readable marking is applied on the top face of the magnetically induced layer and encoded with dark symbols and a dark primer layer is applied on the substrate, and the rear face of the magnetically induced layer is applied on a top face of the dark primer layer.

6. The security marking according to claim 1, wherein the machine readable marking is applied on the top face of the magnetically induced layer and encoded with bright symbols and a dark primer layer is applied on the substrate, and the rear face of the magnetically induced layer is applied on a top face of the dark primer layer.

7. The security marking according to claim 1, wherein the machine readable marking is applied on the substrate and encoded with dark symbols.

8. A method for reading and decoding the security marking according to claim 1, with a portable device equipped with a light source operable to deliver illumination light, an imager, and a processor equipped with a memory and adapted to perform image processing and decoding operations, comprising the steps of:
disposing the security marking within a field of view of the imager;
illuminating the security marking with illumination light delivered by the light source;
acquiring a first digital image of the security marking with the imager at a first viewing angle $\theta_1$ associated with the first elevation angle $\gamma_1$, and storing the acquired first digital image in the memory;
acquiring a second digital image of the security marking with the imager at a second viewing angle $\theta_2$ associated with the second elevation angle $\gamma_2$, and storing the acquired second digital image in the memory;
forming, via image processing with the processor, a composite digital image of the code pattern from the stored first digital image and the stored second digital image by aligning with respect to the reference pattern, detected in the first digital image and the second digital image, a first part of the code pattern corresponding to the first area of the code pattern detected on the first digital image and a second part of the code pattern corresponding to the second area of the code pattern detected on the second digital image, and storing the obtained composite digital image in the memory;
reading and decoding with the processor the code pattern from the stored composite digital image.

9. A portable device for reading and decoding the security marking according to claim 1, comprising:
a light source operable to deliver illumination light;
an imager; and
a processor equipped with a memory,
and adapted to perform the steps of:
illuminating the security marking with illumination light delivered by the light source;

acquiring a first digital image of the security marking with the imager at a first viewing angle $\theta_1$ associated with the first elevation angle $\gamma_1$, and storing the acquired first digital image in the memory;

acquiring a second digital image of the security marking with the imager at a second viewing angle $\theta_2$ associated with the second elevation angle $\gamma_2$, and storing the acquired second digital image in the memory;

forming, via image processing with the processor, a composite digital image of the code pattern from the stored first digital image and the stored second digital image by aligning with respect to the reference pattern, detected in the first digital image and the second digital image, a first part of the code pattern corresponding to the first area of the code pattern detected on the first digital image and a second part of the code pattern corresponding to the second area of the code pattern detected on the second digital image, and storing the obtained composite digital image in the memory;

reading and decoding with the processor the code pattern from the stored composite digital image.

10. A security document delivered by an authority to a user, comprising:

a security marking according to claim 1 applied on the security document, wherein encoded data in the code pattern of the security marking contain digital identity data corresponding to the user and a digital signature of said user digital identity data, the digital signature delivered by the authority being obtained by signing the user digital identity data with a cryptographic key.

11. A method of verifying a security document of a user according to claim 10, with a portable device, the portable device comprising:

a light source operable to deliver illumination light;
an imager; and
a processor equipped with a memory, and adapted to perform the steps of:

illuminating the security marking with illumination light delivered by the light source;

acquiring a first digital image of the security marking with the imager at a first viewing angle $\theta_1$ associated with the first elevation angle $\gamma_1$, and storing the acquired first digital image in the memory;

acquiring a second digital image of the security marking with the imager at a second viewing angle $\theta_2$ associated with the second elevation angle $\gamma_2$, and storing the acquired second digital image in the memory;

forming, via image processing with the processor, a composite digital image of the code pattern from the stored first digital image and the stored second digital image by aligning with respect to the reference pattern, detected in the first digital image and the second digital image, a first part of the code pattern corresponding to the first area of the code pattern detected on the first digital image and a second part of the code pattern corresponding to the second area of the code pattern detected on the second digital image, and storing the obtained composite digital image in the memory;

reading and decoding with the processor the code pattern from the stored composite digital image, the portable device further equipped with a communication unit operable to send and receive data over the communication network to a server of the authority connected to a database storing the cryptographic key and a corresponding decryption key, the method comprising the steps of:

disposing the security marking within a field of view of the imager;

illuminating the security marking of the security document with the light source;

acquiring a first digital image of the illuminated security marking with the imager at a first viewing angle $\theta_1$ associated with the first elevation angle $\gamma_1$, and storing the acquired first digital image in the memory;

acquiring a second digital image of the illuminated security marking with the imager at a second viewing angle $\theta_2$ associated with the second elevation angle $\gamma_2$, and storing the acquired second digital image in the memory;

forming, via image processing with the processor, a composite digital image of the code pattern from the stored first digital image and the stored second digital image by aligning with respect to the reference pattern, detected in the first digital image and the second digital image, a first part of the code pattern corresponding to the first area of the code pattern detected on the first digital image and a second part of the code pattern corresponding to the second area of the code pattern detected on the second digital image;

reading and decoding the code pattern from the composite digital image, and extracting from decoded data of the code pattern a user identity data and a digital signature of said user identity data, via image processing and decoding operations with the processor, and storing the extracted user identity data and digital signature in the memory;

sending a first message containing the extracted user identity data and digital signature stored in the memory via the communication unit to the server;

decrypting at the server the extracted digital signature received in the first message from the portable device with the decryption key stored in the database, and checking whether the extracted user identity data received in the first message matches the received extracted digital signature; and in case of matching, sending back to the portable device a server message indicating a successful verification of the user identity data.

12. The method according to claim 11, comprising, prior to the step of sending back a server message to the portable device, the preliminary steps of:

illuminating the magnetically induced layer with the light source and acquiring a plurality of digital images of the illuminated magnetically induced layer with the imager, the imager being for each different digital image at a corresponding distinct viewing angle $\theta$ with respect to said magnetically induced layer, by moving the imager relatively to the magnetically induced layer parallel to the plane of the substrate;

for each acquired digital image, calculating, with the processor, respectively corresponding intensity I of light reflected by the magnetically induced layer and collected by the imager at corresponding viewing angle $\theta$, and storing the calculated intensities of the reflected light and corresponding viewing angles to obtain a corresponding reflected light intensity curve $I(\theta)$;

sending with the communication unit a second message to the server via the communication network containing the obtained reflected light intensity curve $I(\theta)$;

comparing at the server the reflected light intensity curve $I(\theta)$ received in the second message with a reference reflected light intensity curve $I_{ref}(\theta)$ for said magnetically induced layer stored in the database;

determining at the server whether the magnetically induced layer is genuine based on a result of the comparison; and in case the magnetically induced layer is determined as genuine, sending back to the portable device the server message indicating a successful verification of the user identity data together with an indication that the security marking is genuine, and sending by the server via the communication network a server authorization message to a communication device of the user containing access data granting to the user access to a service.

13. The method according to claim 11, comprising, in case of delivering by the server of a server message indicating a successful verification of the user identity data, the further steps of:

illuminating the magnetically induced layer with the light source and acquiring a plurality of digital images of the illuminated magnetically induced layer with the imager, the imager being for each different digital image at a corresponding distinct viewing angle θ with respect to said magnetically induced layer, by moving the imager relatively to the magnetically induced layer parallel to the plane of the substrate;

for each acquired digital image, calculating, with the processor, respectively corresponding intensity I of light reflected by the magnetically induced layer and collected by the imager at corresponding viewing angle θ, and determining with the calculated intensities of the reflected light and corresponding viewing angles a corresponding reflected light intensity curve $I(\theta)$;

comparing via the processor the reflected light intensity curve $I(\theta)$ with a reference reflected light intensity curve $I_{ref}(\theta)$ for said magnetically induced layer stored in the memory;

determining whether the magnetically induced layer is genuine based on a result of the comparison, and, in case the magnetically induced layer is determined as genuine, sending to the server, with the communication unit via the communication network, a message indicating that the security marking is genuine; and in case of reception at the server of a message from the portable device indicating that the security marking is genuine, sending back by the server via the communication network a server authorization message to a communication device of the user containing access data granting to the user access to a service.

14. A System for verifying a security document according to claim 10 delivered by an authority to a user, comprising:

a server of the authority connected to a database storing the cryptographic key and a corresponding decryption key, and operable to send and receive data via a communication network; and a portable device comprising:
a light source operable to deliver illumination light;
an imager; and
a processor equipped with a memory,
and adapted to perform the steps of:
illuminating the security marking with illumination light delivered by the light source;
acquiring a first digital image of the security marking with the imager at a first viewing angle $\theta_1$ associated with the first elevation angle $\gamma_1$, and storing the acquired first digital image in the memory;
acquiring a second digital image of the security marking with the imager at a second viewing angle $\theta_2$ associated with the second elevation angle $\gamma_2$, and storing the acquired second digital image in the memory;

forming, via image processing with the processor, a composite digital image of the code pattern from the stored first digital image and the stored second digital image by aligning with respect to the reference pattern, detected in the first digital image and the second digital image, a first part of the code pattern corresponding to the first area of the code pattern detected on the first digital image and a second part of the code pattern corresponding to the second area of the code pattern detected on the second digital image, and storing the obtained composite digital image in the memory;

reading and decoding with the processor the code pattern from the stored composite digital image, for reading and decoding the security marking on the security document, comprising:
a light source operable to deliver illumination light;
an imager;
a communication unit operable to send and receive data over the communication network to the server; and
a processor equipped with a memory and adapted to perform image processing and decoding operations, and adapted to carry out the steps of:

illuminating the security marking with illumination light delivered by the light source;

acquiring a first digital image of the security marking with the imager at a first viewing angle $\theta_1$ associated with the first elevation angle $\gamma_1$, and storing the acquired first digital image in the memory;

acquiring a second digital image of the security marking with the imager at a second viewing angle $\theta_2$ associated with the second elevation angle $\gamma_2$, and storing the acquired second digital image in the memory;

forming, via image processing with the processor, a composite digital image of the code pattern from the stored first digital image and the stored second digital image by aligning with respect to the reference pattern, detected in the first digital image and the second digital image, a first part of the code pattern corresponding to the first area of the code pattern detected on the first digital image and a second part of the code pattern corresponding to the second area of the code pattern detected on the second digital image, and storing the obtained composite digital image in the memory;

reading and decoding with the processor the code pattern from the stored composite digital image;

wherein the system is further adapted to carry out the steps of:

extracting from decoded data of the code pattern a user identity data and a digital signature of said user identity data, via image processing and decoding operations with the processor, and storing the extracted user identity data and digital signature in the memory;

sending a first message containing the extracted user identity data and digital signature stored in the memory via the communication unit to the server;

decrypting at the server the extracted digital signature received in the first message from the portable device with the decryption key stored in the database, and checking whether the extracted user identity data received in the first message matches the received extracted digital signature; and in case of matching, sending back to the portable device a server message indicating a successful verification of the user identity data.

15. The system according to claim 14, wherein
the server is further adapted to send data via the communication network to a communication device of the user; and
the server and the portable device are further adapted to carry out steps of a method of verifying the security document of a user, with a portable device, the portable device comprising:
a light source operable to deliver illumination light;
an imager; and
a processor equipped with a memory,
and adapted to perform the steps of:
illuminating the security marking with illumination light delivered by the light source;
acquiring a first digital image of the security marking with the imager at a first viewing angle $\theta_1$ associated with the first elevation angle $\gamma_1$, and storing the acquired first digital image in the memory;
acquiring a second digital image of the security marking with the imager at a second viewing angle $\theta_2$ associated with the second elevation angle $\gamma_2$, and storing the acquired second digital image in the memory;
forming, via image processing with the processor, a composite digital image of the code pattern from the stored first digital image and the stored second digital image by aligning with respect to the reference pattern, detected in the first digital image and the second digital image, a first part of the code pattern corresponding to the first area of the code pattern detected on the first digital image and a second part of the code pattern corresponding to the second area of the code pattern detected on the second digital image, and storing the obtained composite digital image in the memory;
reading and decoding with the processor the code pattern from the stored composite digital image, the portable device further equipped with a communication unit operable to send and receive data over the communication network to a server of the authority connected to a database storing the cryptographic key and a corresponding decryption key, the method comprising the steps of:
disposing the security marking within a field of view of the imager;
illuminating the security marking of the security document with the light source;
acquiring a first digital image of the illuminated security marking with the imager at a first viewing angle $\theta_1$ associated with the first elevation angle $\gamma_1$, and storing the acquired first digital image in the memory;
acquiring a second digital image of the illuminated security marking with the imager at a second viewing angle $\theta_2$ associated with the second elevation angle $\gamma_2$, and storing the acquired second digital image in the memory;
forming, via image processing with the processor, a composite digital image of the code pattern from the stored first digital image and the stored second digital image by aligning with respect to the reference pattern, detected in the first digital image and the second digital image, a first part of the code pattern corresponding to the first area of the code pattern detected on the first digital image and a second part of the code pattern corresponding to the second area of the code pattern detected on the second digital image;
reading and decoding the code pattern from the composite digital image, and extracting from decoded data of the code pattern a user identity data and a digital signature of said user identity data, via image processing and decoding operations with the processor, and storing the extracted user identity data and digital signature in the memory;
sending a first message containing the extracted user identity data and digital signature stored in the memory via the communication unit to the server;
decrypting at the server the extracted digital signature received in the first message from the portable device with the decryption key stored in the database, and checking whether the extracted user identity data received in the first message matches the received extracted digital signature; and
in case of matching, sending back to the portable device a server message indicating a successful verification of the user identity data,
wherein prior to the step of sending back a server message to the portable device, the method comprises preliminary steps of:
illuminating the magnetically induced layer with the light source and acquiring a plurality of digital images of the illuminated magnetically induced layer with the imager, the imager being for each different digital image at a corresponding distinct viewing angle $\theta$ with respect to said magnetically induced layer, by moving the imager relatively to the magnetically induced layer parallel to the plane of the substrate;
for each acquired digital image, calculating, with the processor, respectively corresponding intensity I of light reflected by the magnetically induced layer and collected by the imager at corresponding viewing angle $\theta$, and storing the calculated intensities of the reflected light and corresponding viewing angles to obtain a corresponding reflected light intensity curve $I(\theta)$;
sending with the communication unit a second message to the server via the communication network containing the obtained reflected light intensity curve $I(\theta)$;
comparing at the server the reflected light intensity curve $I(\theta)$ received in the second message with a reference reflected light intensity curve $I_{ref}(\theta)$ for said magnetically induced layer stored in the database;
determining at the server whether the magnetically induced layer is genuine based on a result of the comparison; and
in case the magnetically induced layer is determined as genuine, sending back to the portable device the server message indicating a successful verification of the user identity data together with an indication that the security marking is genuine, and sending by the server via the communication network a server authorization message to a communication device of the user containing access data granting to the user access to a service.

16. The marking according to claim 6, wherein the dark primer layer is a black primer layer.

* * * * *